United States Patent
Pantofaru et al.

(10) Patent No.: US 9,600,723 B1
(45) Date of Patent: Mar. 21, 2017

(54) SYSTEMS AND METHODS FOR ATTENTION LOCALIZATION USING A FIRST-PERSON POINT-OF-VIEW DEVICE

(71) Applicant: Google Inc., Mountian View, CA (US)

(72) Inventors: Caroline Rebecca Pantofaru, Menlo Park, CA (US); Vinay Bettadapura, Atlanta, GA (US); Krishna Bharat, Palo Alto, CA (US); Irfan Essa, Atlanta, GA (US)

(73) Assignee: GOOGLE INC., Mountain View, CA (US)

( * ) Notice: Subject to any disclaimer, the term of this patent is extended or adjusted under 35 U.S.C. 154(b) by 279 days.

(21) Appl. No.: 14/324,005

(22) Filed: Jul. 3, 2014

(51) Int. Cl.
*G06K 9/00* (2006.01)
*G06K 9/62* (2006.01)

(52) U.S. Cl.
CPC ......... *G06K 9/00677* (2013.01); *G06K 9/623* (2013.01)

(58) Field of Classification Search
None
See application file for complete search history.

(56) References Cited

U.S. PATENT DOCUMENTS

| | | | | |
|---|---|---|---|---|
| 6,144,375 | A * | 11/2000 | Jain | G06F 17/30017 345/420 |
| 7,996,771 | B2 | 8/2011 | Girgensohn | |
| 8,854,457 | B2 | 10/2014 | De Vleeschouwer | |
| 9,138,652 | B1 * | 9/2015 | Thompson | H04N 21/2358 |
| 2004/0090472 | A1 | 5/2004 | Risch | |
| 2009/0009605 | A1 * | 1/2009 | Ortiz | H04N 5/232 348/157 |
| 2010/0208064 | A1 | 8/2010 | Liu | |
| 2012/0076357 | A1 | 3/2012 | Yamamoto | |
| 2012/0198317 | A1 | 8/2012 | Eppolito | |
| 2014/0037140 | A1 * | 2/2014 | Benhimane | G06K 9/6211 382/103 |
| 2014/0294361 | A1 | 10/2014 | Acharya | |
| 2015/0026578 | A1 * | 1/2015 | Rav-Acha | G11B 27/034 715/723 |
| 2015/0235367 | A1 * | 8/2015 | Langer | G06T 7/0042 348/135 |
| 2016/0125267 | A1 * | 5/2016 | Goldman | G06T 7/0028 348/47 |

OTHER PUBLICATIONS

Bryan. Nicholas J., Paris Smaragdis, and Gautham J. Mysore, "Clustering and Synchronizing Multi-Camera Video Via Landmark Cross-Correlation", Acoustics, Speech and Signal Processing (ICASSP), 2012 IEEE International Conference on IEEE, 2012,4 pages.

(Continued)

*Primary Examiner* — Soo Jin Park
(74) *Attorney, Agent, or Firm* — Lowenstein Sandler LLP

(57) ABSTRACT

A method for localizing the attention of a user of a first-person point-of-view (FPPOV) device is disclosed. The method includes receiving a plurality of images of an event, each image having been captured by one of a plurality of reference cameras during a first time duration. The method further includes receiving a first user-captured image captured by the FPPOV device during the first time duration. A first image of the plurality of images is selected as a best-matched image, based on the first user-captured image, for capturing a region-of-interest.

20 Claims, 13 Drawing Sheets

(56) References Cited

OTHER PUBLICATIONS

Cremer, Markus, and Randall Cook, "Machine-Assisted Editing of User-Generated Content", SPIE-IS&T, vol. 7254, pp. 1-8, Electronic Imaging, International Society for Optics and Photonics, 2009.
Kennedy, Lyndon, and Mor Naaman, "Less Talk, More Rock: Automated Organization of Community-Contributed collections of Concert Videos", Proceedings of the 18th international conference on World wide web, ACM, 2009, 10 pages.
Shrestha, Prarthana, Mauro Barbieri, and Hans Weda, "Synchronization of Multi-Camera Video Recordings Based on Audio", Proceedings of the 15th international conference on Multimedia, ACM, 2007, pp. 545-548.
Lowe D. G., "Distinctive Image Features from Scale-Invariant Keypoints", International Journal of Computer Vision, 2004, pp. 91-110, 60(2):91-110, Kluwer Academic Publishers, The Netherlands.
Agarwal, S. et al., "Building Rome in a Day", Communications of the ACM, Oct. 2011, pp. 105-112, vol. 54, No. 10, Originally published in Proceedings of the 2009 IEEE International Conference on Computer Vision, pp. 72-79. IEEE, 2009. 1.

\* cited by examiner

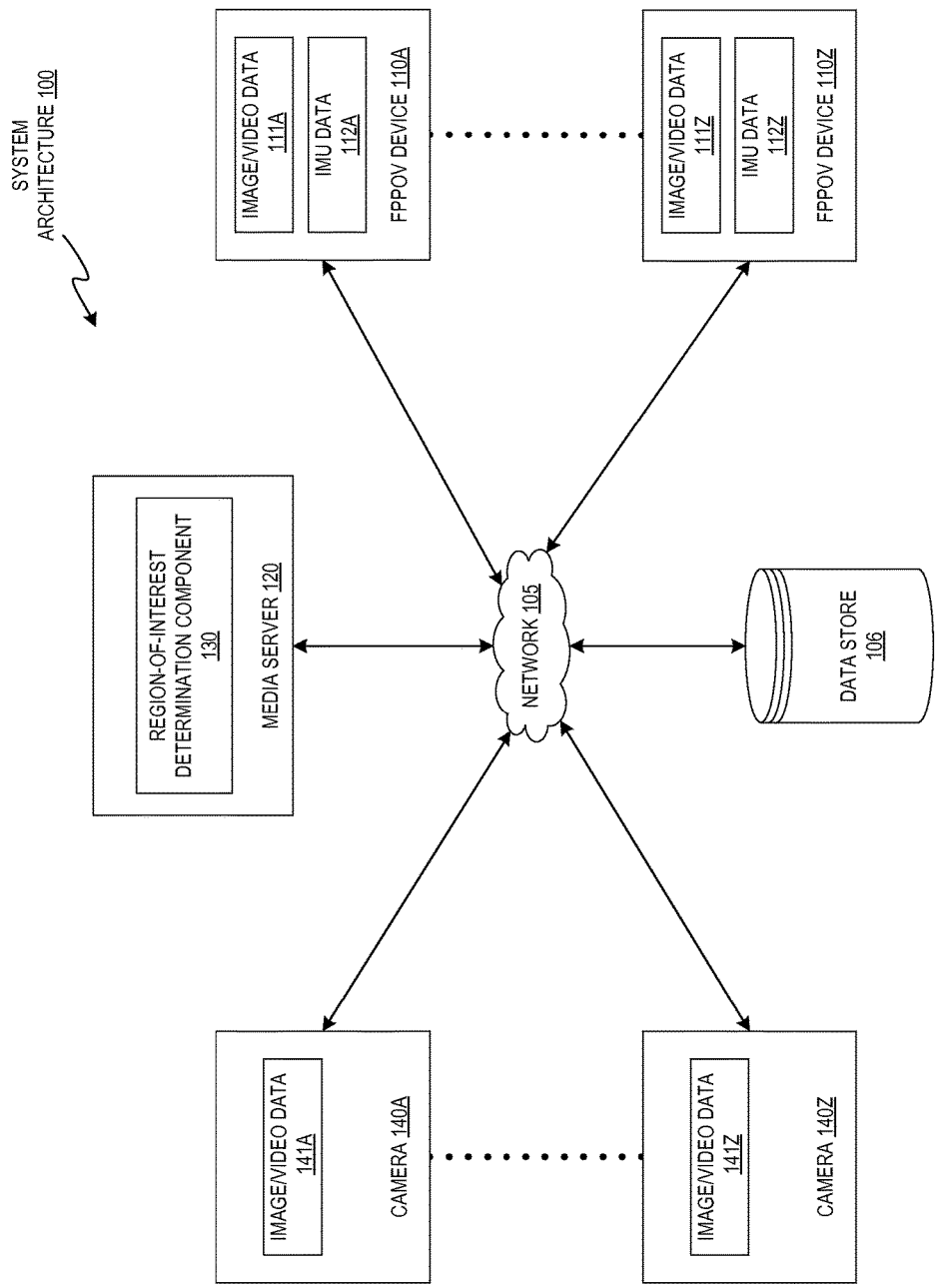

US 9,600,723 B1

SYSTEMS AND METHODS FOR ATTENTION LOCALIZATION USING A FIRST-PERSON POINT-OF-VIEW DEVICE

TECHNICAL FIELD

This disclosure relates to the field of determining the attention of individuals, in particular, detecting regions-of-interest by analyzing data captured by first-person point-of-view devices.

BACKGROUND

Multiple cameras may be deployed at an event to simultaneously capture video streams or images from different angles and transmit the captured video streams or images to a device for annotation and/or editing. A human operator may act as an editor to decide which stream of video contains a region-of-interest (e.g., the most salient object or person) and select the best video feed among the multiple video streams for any given moment. Lower-cost systems, such as video conference systems, may attempt to perform video editing automatically (without the human editor). Currently, some automated systems utilize sound volumes as a basis for determining the best video feed. For example, the automated systems may select the video stream that has the highest sound volume as the one that best captures the region-of-interest. However, the sound volume may be a poor indicator when sound signals are amplified by sound amplification systems, and it does not provide any information as to which particular region of a video stream is the region of interest. Other systems use the amount of motion in video streams as an indicator of the region-of-interest. However, the amount of motion may not be reliable for certain situations. For example, the speaker at a meeting may move too little to serve as a suitable basis for motion analysis, but is nevertheless the center of attention for other individuals present at the meeting.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

Implementations of the present disclosure relate to a method for localizing the attention of a user of a first-person point-of-view device. In particular, the method includes receiving a plurality of images of an event, each image having been captured by one of a plurality of reference cameras during a first time duration. The method further includes receiving a first user-captured image captured by the first-person point-of-view device during the first time duration. A first image of the plurality of images is selected as a best-matched image, based on the first user-captured image, for capturing a region-of-interest.

In one or more of the disclosed implementations, computing devices for performing the operations of the above described implementations are also disclosed. Additionally, in implementations of the disclosure, a computer-readable storage media stores methods for performing the operations of the above described implementations.

BRIEF DESCRIPTION OF THE DRAWINGS

The present disclosure is illustrated by way of example, and not by way of limitation, in the figures of the accompanying drawings, in which:

FIG. 1 illustrates an example system architecture, in accordance with an implementation of the present disclosure;

DETAILED DESCRIPTION

Figure 2A:
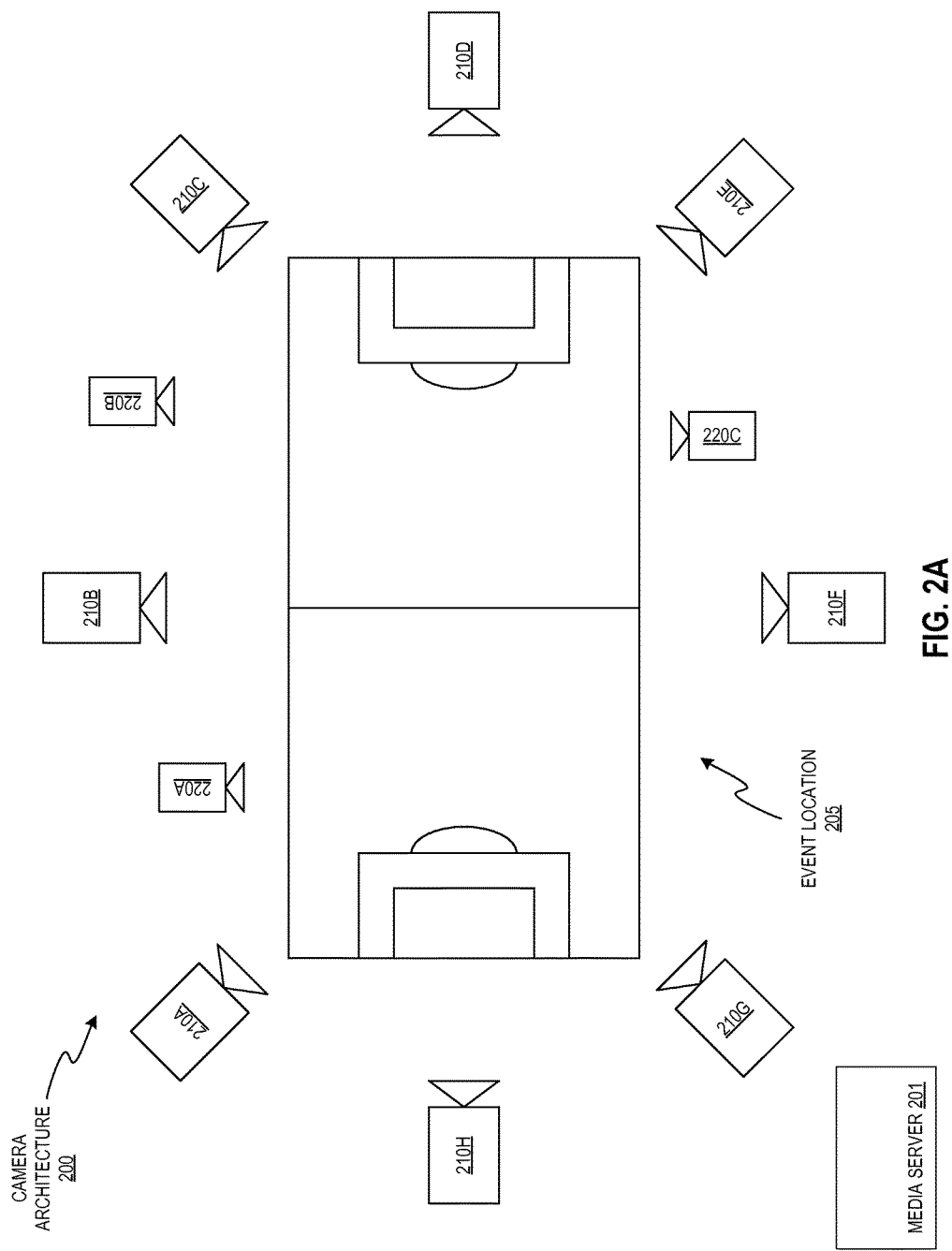
FIG. 2A is a block diagram illustrating an example camera architecture, in accordance with an implementation of the present disclosure.

Localizing individuals in an environment has been achieved by various technologies, including the use of global positioning systems (GPS), inertial measurement units (IMUs), and others. While localization is a precursor to determining the attention of individuals, developing new applications and technologies that utilize localization methods to identify what is interesting or salient in a scene or event has proven challenging. Moreover, due to the unconstrained nature of the data, general attention localization approaches are unlikely to be applicable for all outdoor and indoor environments.

The implementations of the present disclosure provide for localizing the attention of users of first-person point-of-view (FPPOV) devices. Specifically, the present disclosure addresses the use of FPPOV devices for the understanding and filming of scenes and events. Localization of the attention of an individual user may be made tractable by introducing a reference dataset, which may be a visual model of the environment that is concurrently captured and stored. Data captured by one or more FPPOV devices can be matched and correlated against this reference dataset, allowing for transfer of information from the user's reference frame to a global reference frame of the environment to determine what is interesting to the user at any given time. For example, reference cameras may be installed in various venues that provide pre-captured or concurrently captured visual information.

As used herein, the terms "user" and "first-person" may refer to any individual that is capturing data from his/her point-of-view using an FPPOV device. The term "region-of-interest" may refer to a spatio-temporal area in an image, video, scene or event that is interesting to one or more individuals or to an automated system. The term "FPPOV device" may refer to any device that a first-person holds or wears that can be used to capture one or more of image, video, audio, or sensor data. Video captured by an FPPOV device may also be referred to as "egocentric video". Examples of FPPOV devices include, but are not limited to, mobile/smart phones, head/body mounted/held cameras, and standalone sensors such as accelerometers, gyroscopes, compasses, and microphones. As used herein, the term "image" may broadly refer to an individual image (e.g., a still image captured by a camera) or an individual frame of video, and the terms "video" or "video data" may refer to one or more collections or sequences of images.

In an exemplary implementation, a first-person is wearing a head-mounted FPPOV device while watching a presentation. He is seated in a position that gives him a good view of the entire scene and is recording the presentation with the FPPOV device. He may purposefully look at what he considers important in the scene for a particular time duration. For example, when the speaker is speaking, the first-person looks at the speaker, and when a member of the audience asks a question, the first-person shifts his focus and looks at the audience member who is asking the question. Data captured by the FPPOV device, including image, video, audio, and/or IMU data, may be used for mapping the image of the region-of-interest (ROI) captured by the FPPOV device to video frames and/or images captured by reference cameras located in various positions at the scene. The best-matched camera for capturing the ROI is determined for the given time duration, and may be used to generate a content video or live video stream, as well as be used for video analysis and video annotation applications.

FIG. 1 illustrates an example system architecture 100, in accordance with an implementation of the disclosure, for capturing attention information from an FPPOV device. The system architecture 100 includes FPPOV devices 110A through 110Z, a network 105, a data store 106, a media server 120, and cameras 140A through 140Z.

In one implementation, one or more of the FPPOV devices 110A through 110Z may capture and store image/video data 111A through 111Z, respectively, which may include image data (e.g., a series of static images), video data, and/or audio data (e.g., which may be embedded within the video data or may be separate data). The image/video data 111A through 111Z may be made accessible to other devices of system architecture 100 via the network 105. For example, captured image/video data may be transmitted to (e.g., streamed in real-time during capture or transmitted at a later time after capturing the data) the media server 120 and/or the data store 106. Each of FPPOV devices 110A through 110Z may also capture IMU data 112A through 112Z, respectively, which may include IMU data (e.g., gyroscopic data, magnetometer data, GPS data, etc.) recorded by the respective FPPOV device while in use. For example, IMU data 112A recorded while a user is wearing FPPOV device 110A on his/her head may record one or more of a gaze direction (e.g., based on calibration with various reference points and/or detected eye motion/orientation), physical location (e.g., GPS coordinates), and orientation of the user's head (e.g., angles relative to a reference frame). The IMU data 121A through 121Z may be made accessible to other devices of system architecture 100 via the network 105.

Each of FPPOV devices 110A through 110Z may be operated by a different user. Each user may use his/her FPPOV device to record video and/or capture images of the scene or event to capture an ROI. Data captured by an FPPOV device may closely correspond to a point-of-view of the user (e.g., the FPPOV device may be wearable on the user's head), and may accordingly serve as an indicator of the ROI.

In one implementation, one or more of the cameras 140A through 140Z may be reference cameras (e.g., stationary and/or non-user operated cameras) that are each positioned at a particular location of an event, as will be described below in more detail with respect to FIGS. 2A and 2B. Each of cameras 140A through 140Z may capture and store image/video data 141A through 141Z, respectively. Image/video data 141A through 141Z may be made accessible to other devices of the system architecture 100 via the network 105. For example, captured image/video data may be transmitted to (e.g., streamed in real-time during capture or transmitted at a later time after capturing the data) the media server 120 and/or the data store 106.

In one implementation, network 105 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof. In some implementations, network 105 may be a combination of different types of networks. For example, image/video data from any of cameras 140A through 140Z and FPPOV devices 110A through 110Z may be transmitted through a wired LAN network, while IMU data from any of FPPOV devices 110A through 110Z may be transmitted via Wi-Fi or Bluetooth. In one implementation, the data store 106 may be a memory (e.g., random access memory), a cache, a drive (e.g., a hard drive), a flash drive, a database system, or another type of component or device capable of storing data. The data store 106 may also include multiple storage components (e.g., multiple drives or multiple databases) that may also span multiple computing devices (e.g., multiple server computers). In some implementations, the data store 106 may be cloud-based. One or more of the devices of system architecture 100 may utilize the data store 106 to store public and private data, and the data store 106 may be configured to provide secure storage for private data.

In one implementation, the media server 120 may be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to store video/image data and any other data pertaining to the devices of system architecture 100 (e.g., IMU data).

The media server may utilize a region-of-interest determination component 130 to identify an ROI of one or more users (e.g., users of FPPOV devices 110A through 110Z), and to generate a content item or control a video feed to capture based on the identified ROI. The media server 120 may generate content items based on video/image data received from one or more of the FPPOV devices 110A through 110Z and/or one or more of the cameras 140A through 140Z. The content items may be, for example, a video that includes video footage assembled from received video/image data. The media server 120 may also control a video feed that is transmitted to a separate location and/or is broadcasted (e.g., via network 105). For example, at various time durations, the media server 120 may designate one of the devices of system architecture 100 as a source video feed (e.g., video may be sourced from camera 140A for the first minute, and video may then be sourced from FPPOV device 110A for the next minute). Further description of the region-of-interest determination component 150 and its specific functions is provided in more detail with respect to FIG. 3.

FIG. 2A is a block diagram illustrating an example camera architecture 200, in accordance with an implementation of the present disclosure. In one implementation, camera architecture 200 utilizes system architecture 100. In one implementation, the camera architecture 200 may allow for the capturing of videos and/or sequences of images of an event that occurs at the event location 205. For example, the camera architecture 200 may capture videos and/or images of a soccer game, a basketball game, a football game, a baseball game, a hockey game, or any other type of spectator event occurring at the event location 205. In other implementations, the event and/or event location 205 may be any shape (e.g., circular, oval, rectangular, square, irregular shapes, etc.).

The camera architecture 200 includes reference cameras 210A through 210H positioned around and/or within the event location 205, which may correspond to some or all of cameras 140A through 140Z described with respect to FIG. 1. The reference cameras 210A through 210H may be devices that are capable of capturing and/or generating images (e.g., pictures) and/or videos (e.g., sequences of images with/without audio) of the event location 205. For example, the reference cameras 210A through 210H may include, but are not limited to, digital cameras, digital video recorders, camcorders, smartphones, webcams, tablet computers, etc. In one implementation, the reference cameras 210A through 210H may capture video and/or images of an event location 205 (e.g., of an event at the event location 205) at a certain speed and/or rate. For example, the reference cameras 210A through 210H may capture multiple images of the event location 205 at a rate of one hundred images or frames per second (FPS), at thirty FPS, or at any suitable rate. The reference cameras 210A through 210H may be digital cameras or may be film cameras (e.g., cameras that capture images and/or video on physical film). The images and/or videos captured and/or generated by the reference cameras 210A through 210H may be in a variety of formats including, but not limited to, moving picture experts group format, MPEG-4 (MP4) format, DivX® format, Flash® format, a QuickTime® format, an audio visual interleave (AVI) format, a Windows Media Video (WMV) format, an H.264 (h264, AVC) format, a Joint Picture Experts Group (JPEG) format, a bitmap (BMP) format, a graphics interchange format (GIF), a Portable Network Graphics (PNG) format, etc. In one implementation, the images (e.g., arrays of images) and/or videos captured by one or more of the reference cameras 210A through 210H may be stored in a data store such as memory (e.g., random access memory), a disk drive (e.g., a hard disk drive or a flash disk drive), and/or a database.

In one implementation, the operation of the reference cameras 210A through 210H may be synchronized with each other and the reference cameras 210A through 210H may capture images and/or videos of the event location 205 in a synchronized and/or coordinated manner (e.g., the videos captured by the reference cameras 210A through 210H may be synchronized in time). Although eight reference cameras (e.g., reference cameras 210A through 210H) are illustrated in FIG. 2A, it should be understood that in other implementations, any number of reference cameras may be included in the camera architecture 200. For example, the camera architecture 200 may include twenty to fifty reference cameras.

In other implementations, the positions of the reference cameras (and thus the viewpoints of the event location 205 for the cameras) may vary. For example, the reference cameras 210A through 210H may be arranged around the event location 205 in a variety of different layouts and/or positions (e.g., two cameras along each edge of the event location 205) and/or at least some of the reference cameras 210A through 210H may be positioned within the event location (e.g., a camera may be held/worn by a participant of the event). In one implementation, one or more of the reference cameras 210A through 210H are static, stationary cameras that capture video/images of the event location 205 without panning, tilting, or zooming. In one implementation, one or more of the reference cameras 210A through 210H are dynamic cameras that dynamically capture video/images of the event location 205 by panning, tilting, and/or zooming.

The camera architecture 200 also includes FPPOV devices 220A through 220C positioned around and/or within the event location 205, which may correspond to some or all of the FPPOV devices 110A through 110Z described with respect to FIG. 1. FPPOV devices 220A through 220C are depicted as being used/held/worn by members of the audience of event location 205. In some implementations, one or more of FPPOV devices 220A through 220C and/or additional FPPOV devices may be used by athletes/performers at event location 205 (e.g., an FPPOV device may be worn by a basketball player during a basketball game). The FPPOV devices 220A through 220C may be devices that are capable of capturing and/or generating images (e.g., pictures) and/or videos (e.g., a sequence of images) of the event location 205, and have all of the same functionality described above with respect to reference cameras 210A through 210H. For example, FPPOV devices 220A through 220C may include, but are not limited to, wearable cameras, digital cameras, digital video recorders, camcorders, smartphones, webcams, tablet computers, etc.

In one implementation, each of the reference cameras 210A through 210H and FPPOV devices 220A through 220C is in communication with a media server 201 via a network (e.g., network 105), which may be located at or within the event location 205 or located remotely. The media server 201 may be the same as or similar to the media server 120 described with respect to FIG. 1. The media server 201 may analyze and/or process the images and/or videos captured by a corresponding camera. In addition, the media server 201 may analyze audio and/or positioning data produced by microphones, wearable computers, and/or IMU sensors. The media server 201 may analyze and/or process the images, videos, audio and/or positioning data to identify regions-of-interest (ROIs) within the images and/or videos. In one implementation, an ROI of a video and/or image may include one or more images and/or frames and may be associated with and/or represent a certain time duration in the event at the event location 205. For example, if the event is a soccer game, an ROI may depict the scoring of a goal that occurred during a particular time duration (e.g., over a 1 second time duration). In another implementation, the ROI may be a spatial portion of the video and/or image. For example, a video and/or image may depict the event from a certain viewpoint (e.g., from the bottom left corner of the event location 205).

In some implementations, the media server 201 may analyze videos and/or images received from one or more FPPOV devices (e.g., FPPOV devices 220A through 220C) to not just identify generally interesting portions but to identify portions that are of interest to a specific viewer or a specific participant of an event. For example, if a viewer of a soccer game (e.g., the user of the FPPOV device) is a parent of one of the soccer players, then an interesting portion for the parent may be the portion containing his/her child. In such implementations, the media server 201 may analyze video, images, and/or IMU data received from an FPPOV device (e.g., worn or held by the parent) to determine one or more cameras capturing the event that best capture the interesting portion of the event (the ROI). In some implementations, the user may additionally wish to insert his/her own personal footage (e.g., recorded by the FPPOV device), resulting in a content item that contains reference-camera captured footage of ROIs as well the personal footage. For example, the user may take an action that indicates that he/she is interested in using the personal footage (a "personalization cue"), such as selecting a record button on the FPPOV device, making a sudden movement (e.g., which may be reflected in a rapid change detected in IMU data), a voice command, etc. In one implementation, the personal footage may be captured in response to an environmental cue. For example, the personal footage may be recorded in response to detecting a sound effect (e.g., a crowd cheering, an announcement, etc.). As another example, recording of the personal footage may begin upon a volume intensity exceeding a threshold value, and may end upon the volume intensity dropping below the threshold value.

In one implementation, summaries of the event may be generated by concatenating temporal ROIs (e.g., by generating a summary video from one or more of personal FPPOV-captured footage and reference camera footage for time durations corresponding to personalization/environmental cues). For example, the event summary may be a video that includes video associated with the personalization and/or environmental cue, while excluding other video. In another implementation, personalization and/or environmental cues may be utilized to determine statistics for a sporting event. For example, environmental sound effects (e.g., crowd cheering when a goal is scored) combined with first-person localization data (e.g., where the first-person is looking when the environmental cue is identified) may be used to determine a game score or other sports statistics. In another implementation, a video stream may be indexed based on personalization and/or environmental cues. For example, video captured by a reference camera may include or be associated with time stamps that correspond to the times at which the personalization and/or environmental cues were identified, and may be used to designate indexed "chapters" and "scenes" within the video.

Figure 2B:
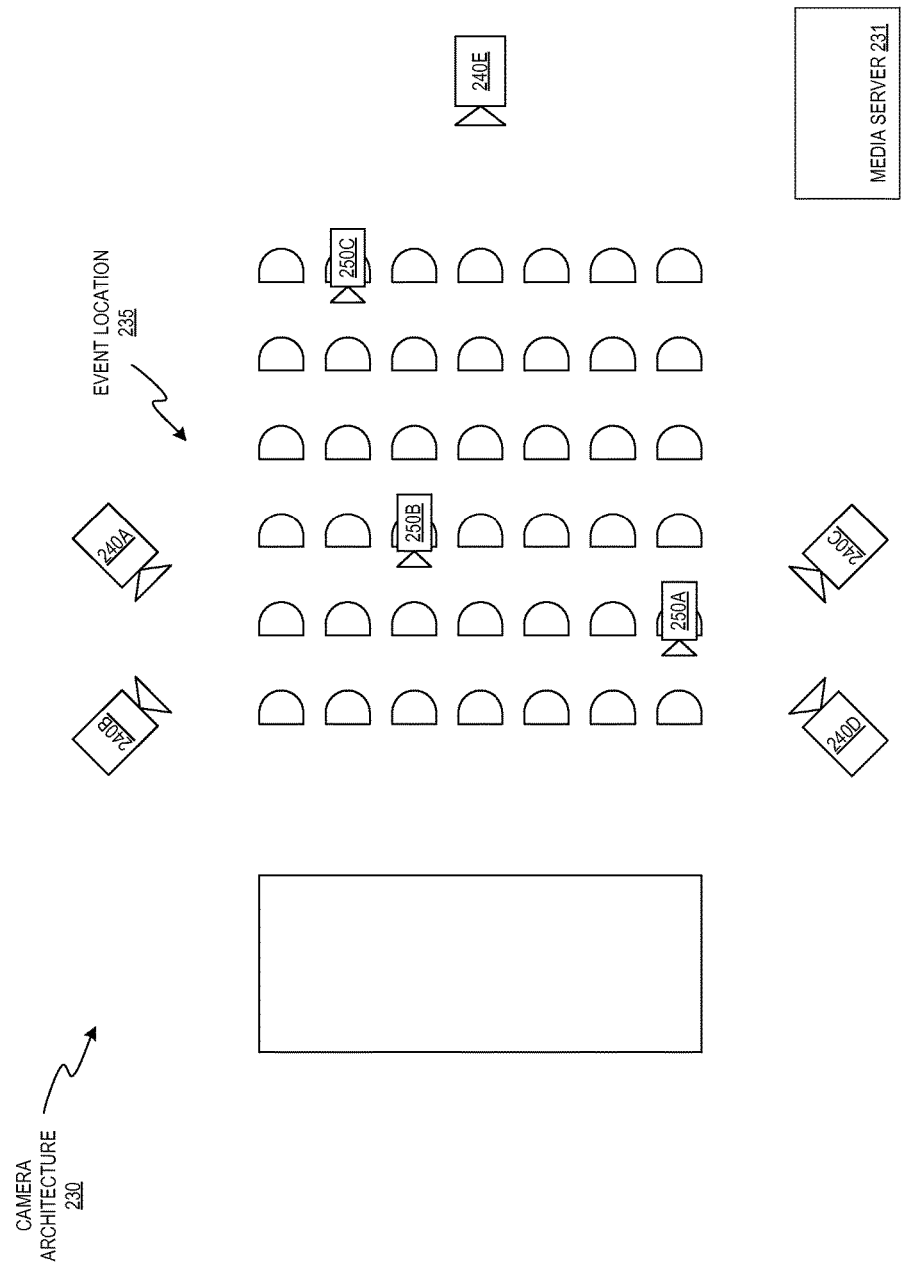
FIG. 2B is a block diagram illustrating an example camera architecture, in accordance with another implementation of the present disclosure.

FIG. 2B is a block diagram illustrating an example camera architecture 230, in accordance with another implementation of the present disclosure. In one implementation, the camera architecture 230 may allow for the capturing of videos and/or sequences of images of an event that occurs at the event location 235. In other implementations the event and/or event location 235 may be any shape (e.g., circular, oval, rectangular, square, irregular shapes, etc.). The camera architecture 230 includes reference cameras 240A through 240E, which may correspond to one or more of the cameras 140A through 140Z described with respect to FIG. 1. The reference cameras 240A through 240E may be devices that are capable of capturing and/or generating images and/or videos of the event location 235 at a certain speed and/or rate. The images and/or videos captured and/or generated by the reference cameras 240A through 240E may be in a variety of formats, as described above.

The reference cameras 240A through 240E are positioned in various locations in the event location 235 such that each reference camera 240A through 240E is provided with a particular viewpoint of the event location 235. For example, the reference cameras 240A through 240E may directly capture a stage or presentation area of the event location 235. The reference cameras 240B and 240D may capture the audience directly. The reference camera 240E may capture the entire event location 235, including the stage or presentation area and the audience. In one implementation, the operation of the reference cameras 240A through 240E may be synchronized with each other, and the reference cameras 240A through 240E may capture images and/or videos of the event location 235 in a synchronized and/or coordinated manner (e.g., the videos captured by the reference cameras 240A through 240E may be synchronized in time). Although five cameras (e.g., reference cameras 240A through 240E) are illustrated in FIG. 2B, it should be understood that in other implementations, any number of reference cameras may be included in the camera architecture 230. In other implementations, the positions of the reference cameras (and thus the viewpoints of the event location for the cameras) may vary. The camera architecture 200 also includes FPPOV devices 250A through 250C positioned around and/or within the event location 235, which may correspond to one or more of the FPPOV devices 110A through 110Z described with respect to FIG. 1. For example, the FPPOV devices 250A through 250C may be operated by users sitting in the audience of event location 235.

In one implementation, each of the reference cameras 240A through 240E and FPPOV devices 250A through 250C is in communication with a media server 231 via a network (e.g., network 105), which may be located at or within the event location 235 or located remotely. The media server 231 may be the same as or similar to media server 120 described with respect to FIG. 1, and may process data received from each of the reference cameras 240A through 240E and the FPPOV devices 250A through 250C in a fashion similar to that described with respect to FIG. 2A.

Figure 3:
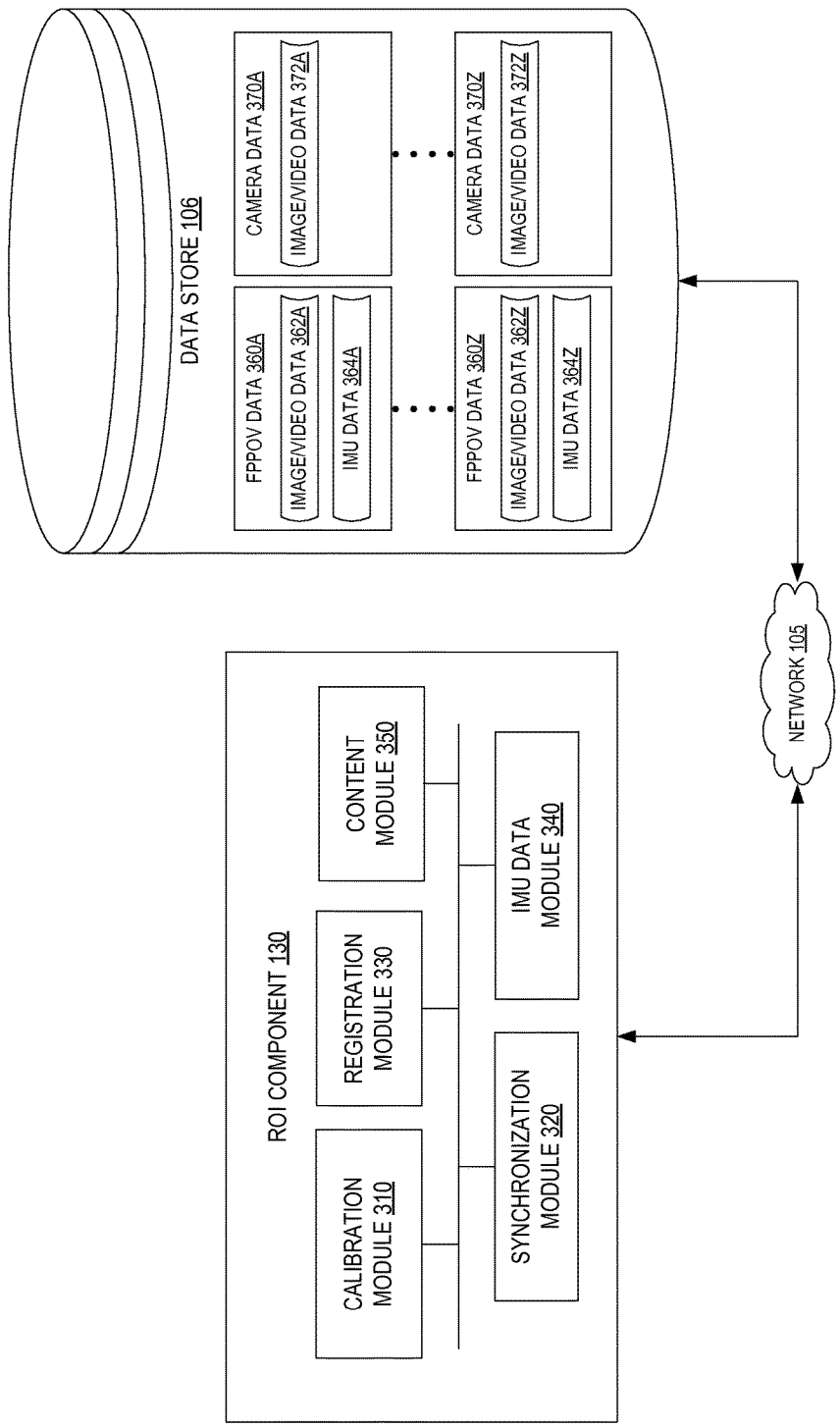
FIG. 3 is a block diagram illustrating a region-of-interest determination component, in accordance with an implementation of the present disclosure.

FIG. 3 is a block diagram illustrating a region-of-interest determination component (or "ROI component") 130, in accordance with an implementation of the present disclosure. In one implementation, the ROI component 130 includes a calibration module 310, a synchronization module 320, a registration module 330, an IMU data module 340, and a content module 350. More or less components may be included in the ROI component 130 without loss of generality. For example, two or more of the modules may be combined into a single module, or one of the modules may be divided into two or more modules. In one implementation, one or more of the modules may reside on different computing devices (e.g., different server computers, on a client device, distributed among multiple client devices, etc.). The ROI component 130 was described as being implemented by the media server 120 of FIG. 1, but may be implemented by any of the FPPOV devices 110A through 110Z and the cameras 140A through 140Z. For example, an FPPOV device (e.g., FPPOV device 110A) may be programmed to perform all of the functions of the ROI component 130. When the ROI component 130 is implemented on an FPPOV device, any functions described with respect to the ROI component 130 that "receive", "transmit", "retrieve", "identify", "determine", etc., are understood to refer to functions performed by sub-systems or sub-modules within the client device rather than across a network (e.g., the network 105), as would be appreciated by one of ordinary skill in the art.

In one implementation, the ROI component 130 is communicatively coupled to the data store 106. For example, the ROI component 130 may be coupled to the data store 106 via a network (e.g., via network 105). As described with respect to FIG. 1, the data store 106 may be a memory (e.g., random access memory), a cache, a drive (e.g., a hard drive), a flash drive, a database system, or another type of component or device capable of storing data. The data store 106 may also include multiple storage components (e.g., multiple drives or multiple databases) that may also span multiple computing devices (e.g., multiple server computers), and may be cloud-based. Data store 106 may be part of or distributed between any of the FPPOV devices 110A through 110Z, the media server 120, and the cameras 140A through 140Z, as described with respect to FIG. 1. In one implementation, the data store 106 may include FPPOV data 360A through 360Z, which include, respectively, image/video data 362A through 362Z and IMU data 364A through 364Z. The FPPOV data 360 through 360Z may have been received from any of FPPOV devices 110A through 110Z, FPPOV devices 220A through 220C, or FPPOV devices 250A through 250C via the network 105. The data store 106 may also include camera data 370A through 370Z, which include, respectively, image/video data 372A through 372Z. The camera data 370A may have been received from any of cameras 140A through 140Z, reference cameras 210A through 210H, or reference cameras 240A through 240E.

In one implementation, the ROI component 130 utilizes the calibration module 310 to calibrate one or more FPPOV devices. The calibration module 310 may process video/image data, IMU data, or any other suitable type of data received from an FPPOV device of a user. In one implementation, a user of an FPPOV device may initialize a media server, or the media server may transmit a message to the FPPOV device indicating that initialization is to be performed. The media server may collect video/image and/or IMU data (e.g., orientation data) from the FPPOV device as the user is asked to point the FPPOV device at specific locations. For example, the user of FPPOV device 250B may be asked to look straight up, straight down, at camera 240B, at camera 240D, at camera 240E, and/or at fixed markers or objects in the event location. The calibration module 310 may then use the received data to determine a relative location of the user (e.g., via triangulation) and/or a gaze orientation/direction of the FPPOV device.

In one implementation, the ROI component 130 utilizes the synchronization module 320 to synchronize video captured by one or more cameras (e.g., cameras 140A through 140Z) and FPPOV devices (e.g., FPPOV devices 110A through 110Z). For example, during the recording/capturing of an event, some of the FPPOV devices and cameras may have begun recording at different times. In order to synchronize the captured video, synchronization module 320 may identify features (e.g., audio or visual features occurring at a particular time) within the recorded video that may be common to one or more of the captured videos. As an illustrative example, FPPOV device 220A and camera 210B may have captured video for a soccer game. FPPOV device 220A may have started to record the soccer game at a later time, T, than camera 210B. The synchronization module 320 may identify a feature (e.g., audio of the crowd cheering for a goal, an announcement made over an intercom, etc.) common to both videos, and normalize the timing of the videos such that the common feature occurs within the videos at the same time or during the same time duration (e.g., by assigning time values to each frame of the respective videos that correspond to a global time, by padding a blank video of duration T onto the beginning of FPPOV-captured video, etc.). In some implementations, the synchronization module 320 may synchronize video based on time stamps associated with each video.

In one implementation, the ROI component 130 utilizes the registration module 330 to identify video/images captured by a camera that best capture an ROI of a user of an FPPOV device (or an overall ROI of users of FPPOV devices). In one implementation, the registration module 330 maps a frame of a video captured by an FPPOV device (e.g., FPPOV device 250B) to a frame of a video captured by a static camera (e.g., camera 240A) corresponding to the same time duration (e.g., for time synchronized videos). The registration module 330 may perform the mapping by identifying common features between each frame, mapping the FPPOV-captured frame onto the camera-captured frame, and generating a score of the mapping. The registration module 330 may perform this mapping between the FPPOV-captured frame and frames from video captured by other cameras (corresponding to the same time duration) to identify a camera that best captures the ROI (e.g., selecting a camera based on the highest scored mapping). In some implementations, when a FPPOV-captured frame has a smaller area than the camera-captured frame, the registration module 330 may designate a crop window within the camera-captured frame based on the mapping, and the crop window may be utilized downstream in generating a content item or live video stream. Registration is discussed in additional detail below with respect to FIGS. 4 and 5.

In one implementation, the ROI component 130 utilizes the IMU data module 340 to process IMU data received from one or more FPPOV devices (e.g., IMU data 112A through 112Z received, respectively, from FPPOV devices 110A through 110Z). In one implementation, head orientation information (and/or eye motion/orientation information obtained from an eye detection sensor) can be used to further refine the matches determined by the registration module 330. For example, if the registration module 330 matches an FPPOV-captured frame to a lower location of a camera-captured frame, but the head orientation information suggests that the person was looking up, then a correction can be applied to the match region and make it compatible with the sensor data (e.g., by shifting a crop window corresponding to the FPPOV-captured frame to an upper location of the camera-captured frame). In one implementation, IMU sensor integration is performed in two steps. First, a set of still images or short video clips are captured by the FPPOV device and matched to the reference cameras. The IMU data corresponds to the initial of the FPPOV device. The IMU data may be recorded continuously and, as the orientation of the FPPOV device changes, the mapping of the FPPOV-captured frames mapped within reference camera frames are moved accordingly. To reduce drift, additional images or short video clips are captured periodically (e.g., every minute or longer) and matched against the reference cameras. The IMU drift, d, is the difference between the matching window location and the location predicted by the IMU (e.g., a center-to-center distance). Until the next images are taken, the IMU orientation reading is corrected by d.

In one implementation, the IMU data module 340 may determine that the user of the FPPOV device is not directed toward an ROI (e.g., the user has placed the FPPOV device on the floor, is looking down, is looking straight up, etc.). In one implementation, the IMU data module 340 may make this determination in response to an orientation of the FPPOV device falling within a pre-defined range. In one implementation, the IMU data module 340 may make this determination in response to observing that the IMU data has not changed or has changed below a threshold during a short time duration (e.g., 5 seconds), which may indicate that the FPPOV is not presently being held or worn by the user (a baseline amount of motion may be expected when the FPPOV device is physically held by the user due to the natural shakiness of human operation). Accordingly, during a time duration in which the IMU data module 340 determines that the FPPOV device is not directed toward an ROI (a "non-interesting time duration"), the IMU data module 340 may cause the ROI component 130 to designate a default camera as the best-matched camera for capturing the ROI during the non-interesting time duration, or may continue to designate the last best-matched camera as the best-matched camera for the non-interesting time duration.

In one implementation, the ROI component 130 utilizes the content module 350 to generate a content item (e.g., a digital video) based on the FPPOV data 360A through 360Z and camera data 370A through 370Z. The content module 350 may analyze the image/video data and IMU data captured by one or more FPPOV devices (e.g., FPPOV devices 220A through 220C) and may combine videos that were determined to have captured an ROI in order to generate a content item. In one implementation, non-overlapping, ROI-capturing video is combined to generate the content item may not overlap in time. For example, reference cameras (e.g., cameras 210A through 210H) may capture videos of an event that are synchronized in time, and a subset of reference cameras that best capture the ROI at various time durations may be identified (e.g., using registration module 330). The content module 350 may select videos clips corresponding to the current ROI such that the selected interesting portions are non-overlapping, and generate a single video from the selected video clips as the content item. In some implementations, the video clips may be overlapping, which may be used to generate "replays" of events in the event location from different reference camera perspectives. In some implementations, certain periods during the event may be designated as non-interesting periods (e.g., during a timeout in a soccer game, during an intermission, etc.). For example, content module 350 may have been configured to determine the ROI captured by one or more FPPOV devices during certain time durations, but not during others. In such cases, content module 350 may select video from a "default camera" (e.g., camera 210F may be designated as a default camera), FPPOV captured video, a static image, and/or pre-recorded video. In some implementations, if an FPPOV device is determined to not be capturing the ROI (e.g., if the FPPOV device is turned off or obstructed, IMU data indicates that the FPPOV device is directed away from the event, etc.), the content module 350 may designated this time duration as a non-interesting time duration.

The content module 350 may combine one or more interesting portions and/or non-interesting portions to generate the content item. This may allow the server computing device to generate a content item that provides a continuous view of the event without gaps in the durations of time of the event. The generated content item can be an after-the-fact summarization or distillation of important moments in the event as determined during or after the event, or it may be a real-time view of the summary of the important moments in the event as determined in real-time during the event. Content items generated after the fact and in real-time can be substantially different even when they pertain to the same event. Generation of the content item based on the interesting portions of the videos identified by a media server is discussed in additional detail below with respect to FIGS. 6-11.

In one implementation, the cameras and FPPOV devices may capture the videos/images of the event and/or event location in real-time or near real-time. For example, the reference cameras 210A through 210H and the FPPOV devices 220A through 220C may provide the captured video (e.g., video stream) to a media server (e.g., media server 201) as the event takes place in the event location (e.g., as at least a portion of the event is still occurring). The media server may use the content module 350 to analyze and/or process the videos generated by the reference cameras and FPPOV devices in real-time or near real-time to identify an ROI of the videos. The content module 350 may also generate a content item (e.g., a digital video) in real-time based on the identified interesting portions (e.g., generating a content item by splicing together and/or combining one or more video captured by a respective reference camera 210A through 201H corresponding to an ROI of a respective FPPOV device 220A through 220C). For example, if the event is a live sports game, the content item may be generated in real-time so that the content item (e.g., the video of the interesting portions of the sports game) may be broadcast live. In some implementations, the content module 350 may designate one of the cameras and/or FPPOV devices as video source from which the real-time or near real-time video is streamed. In some implementations, processing video from each camera/FPPOV device may exceed allocated bandwidth/resources. Accordingly, content module 350 may obtain video frames or still images captured by each of cameras and FPPOV devices at regular intervals (e.g., every second, 5 seconds, etc.). Additionally, or alternatively, the content module 350 may utilize IMU data received from FPPOV devices to identify the ROI (e.g., when an FPPOV device has limitations on power consumption and/or bandwidth).

Figure 4:
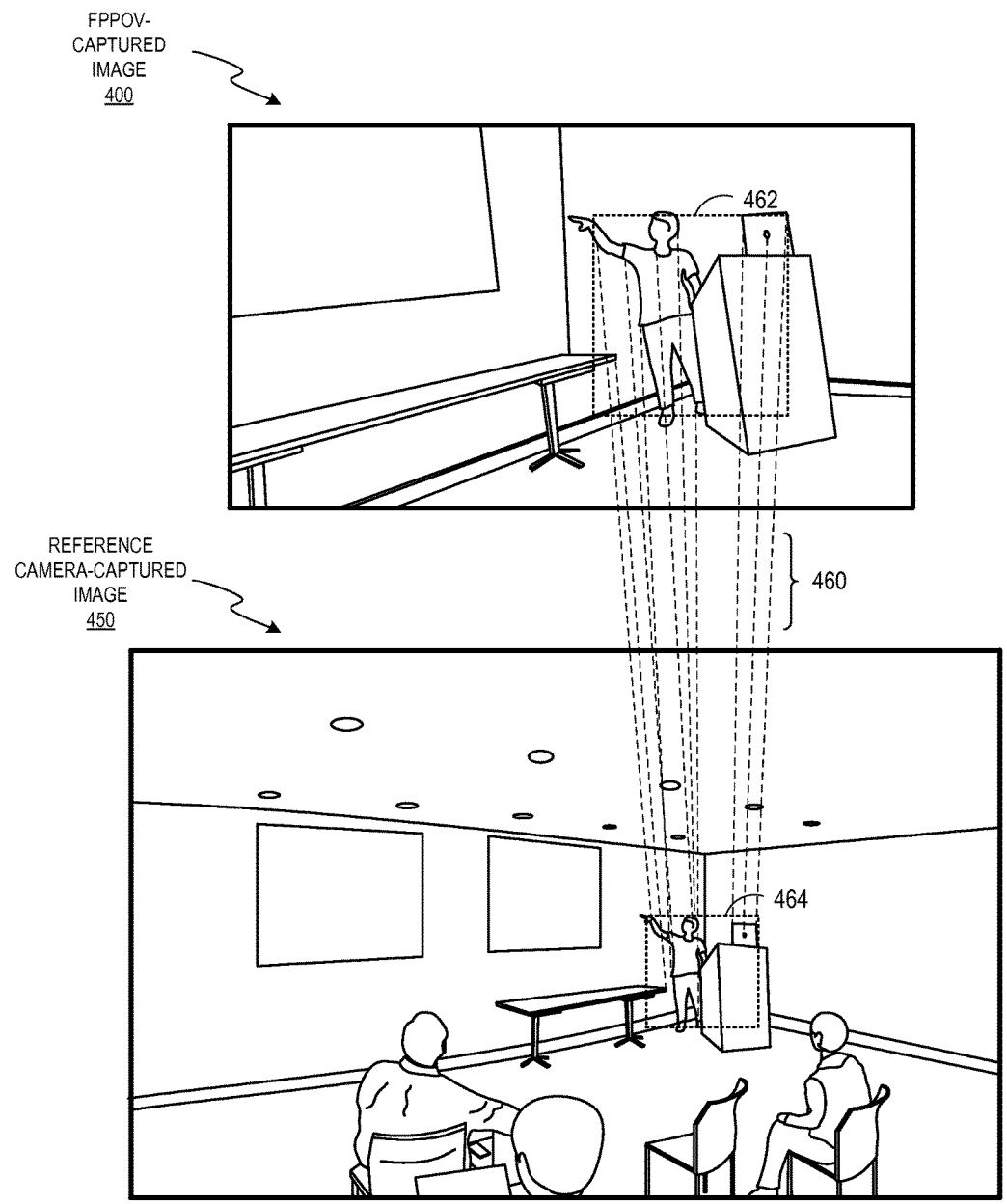
FIG. 4 illustrates mapping of common features between an FPPOV-captured image and a reference camera-captured image or video, in accordance with an implementation of the present disclosure.

FIG. 4 illustrates mapping of common features between an FPPOV-captured image 400 and a reference camera-captured image 450, in accordance with an implementation of the present disclosure. The FPPOV-captured image 400 and the reference camera-captured image 450 may correspond to, respectively, FPPOV device 250B and reference camera 240C of FIG. 2B. At a particular time duration, the ROI may be a speaker giving a presentation, in which a user may be pointing the FPPOV device 250B (which may be a wearable or handheld FPPOV device) toward the speaker. The FPPOV-captured image 400 and the reference camera-captured image 450 may have been extracted from respective videos captured by the FPPOV device 250B and the camera 240C, which were previously synchronized in time (e.g., by the synchronization module 320 of the ROI component 130).

Common points 460 between the FPPOV-captured image 400 and the reference camera-captured image 450 may be identified (e.g., using the registration module 330), and may be represented by bounding boxes 462 and 464. The common points 460 may be identified using feature matching algorithms, including motion-based features, objects (e.g., faces), color histograms, or any other suitable method for identifying common features between images, as would be appreciated by one of ordinary skill in the art. In some implementations, false matches may be eliminated, for example, using a structure-from-motion (SfM) algorithm to estimate a camera matrix followed by optimization using random sample consensus (RANSAC) analysis.

Figure 5:
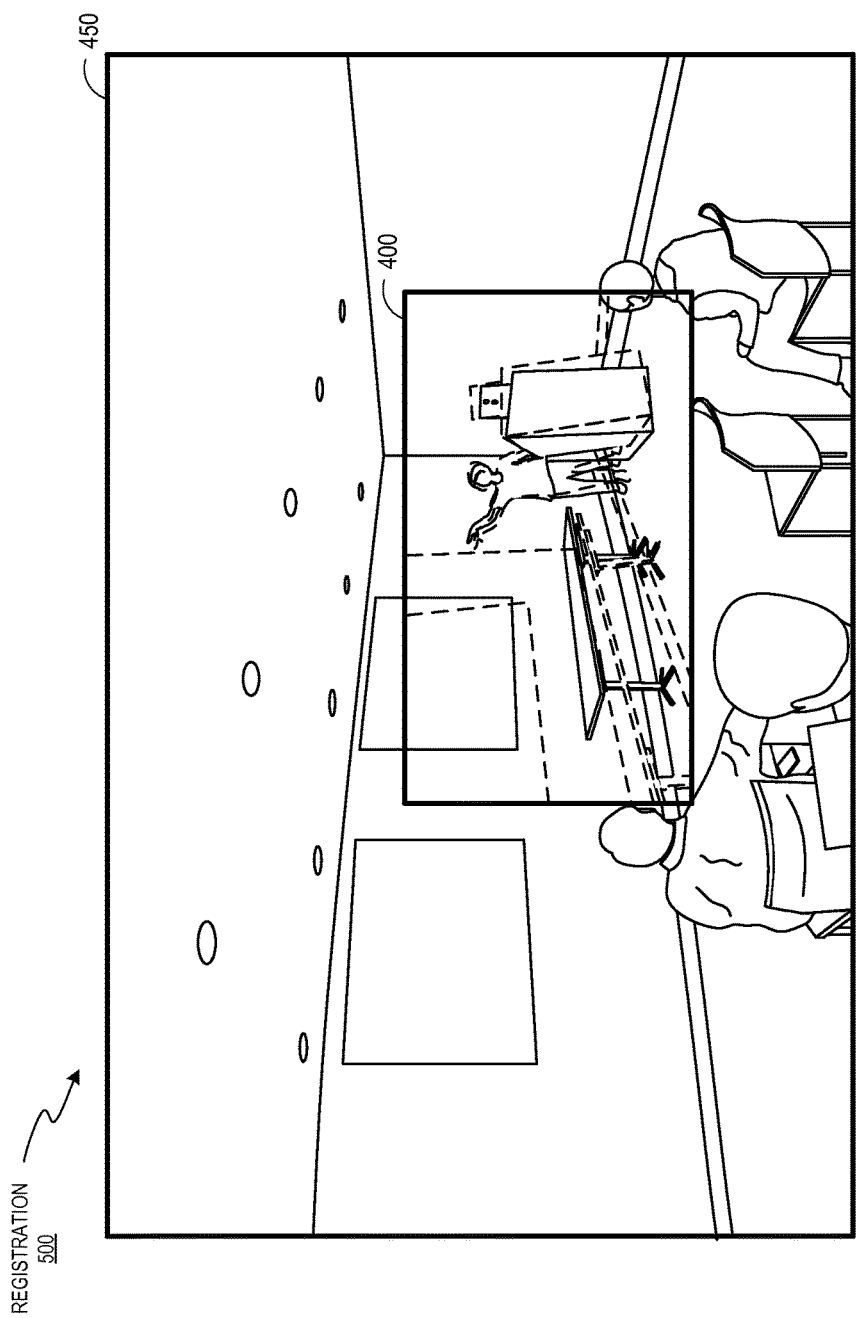
FIG. 5 illustrates mapping of an FPPOV-captured image onto a reference-camera-captured image, in accordance with an implementation of the present disclosure.

FIG. 5 illustrates mapping 500 of the FPPOV-captured image 400 onto the reference-camera-captured image 450, in accordance with an implementation of the present disclosure. Based on the identified common points 460, the FPPOV-captured image 400 is registered onto the reference-camera-captured image 450 (e.g., by computing and applying an affine transformation). A score may be generated by computing descriptors (e.g., GIST descriptors) of the FPPOV-captured image 400 and the reference-camera-captured image 450, which provide a measure of visual similarity between the FPPOV-captured image 400 and the reference-camera-captured image 450. The descriptors are computed for both the images and an $L^2$ squared distance between is calculated, resulting in a final attention localization score (e.g., a perfect match will have a score of zero). In some implementations, a crop-window within the reference-camera-captured image 450 may be defined based on a boundary of the FPPOV-captured image 400 after mapping. The mapping and scoring depicted in FIGS. 4 and 5 may be performed for concurrently-captured frames/images corresponding to other reference cameras in order to determine a best-matched reference camera for capturing an ROI (e.g., the camera corresponding to the highest scored mapping). In some implementations, a score assigned to an image or frame captured by a reference camera may be discarded if the score exceeds a threshold confidence value. In some implementations, if all reference cameras are discarded for failing to satisfy the threshold condition for a particular time duration, a default camera or a previously designated best-matched camera may be selected as the best-matched camera for the time duration.

Figure 6:
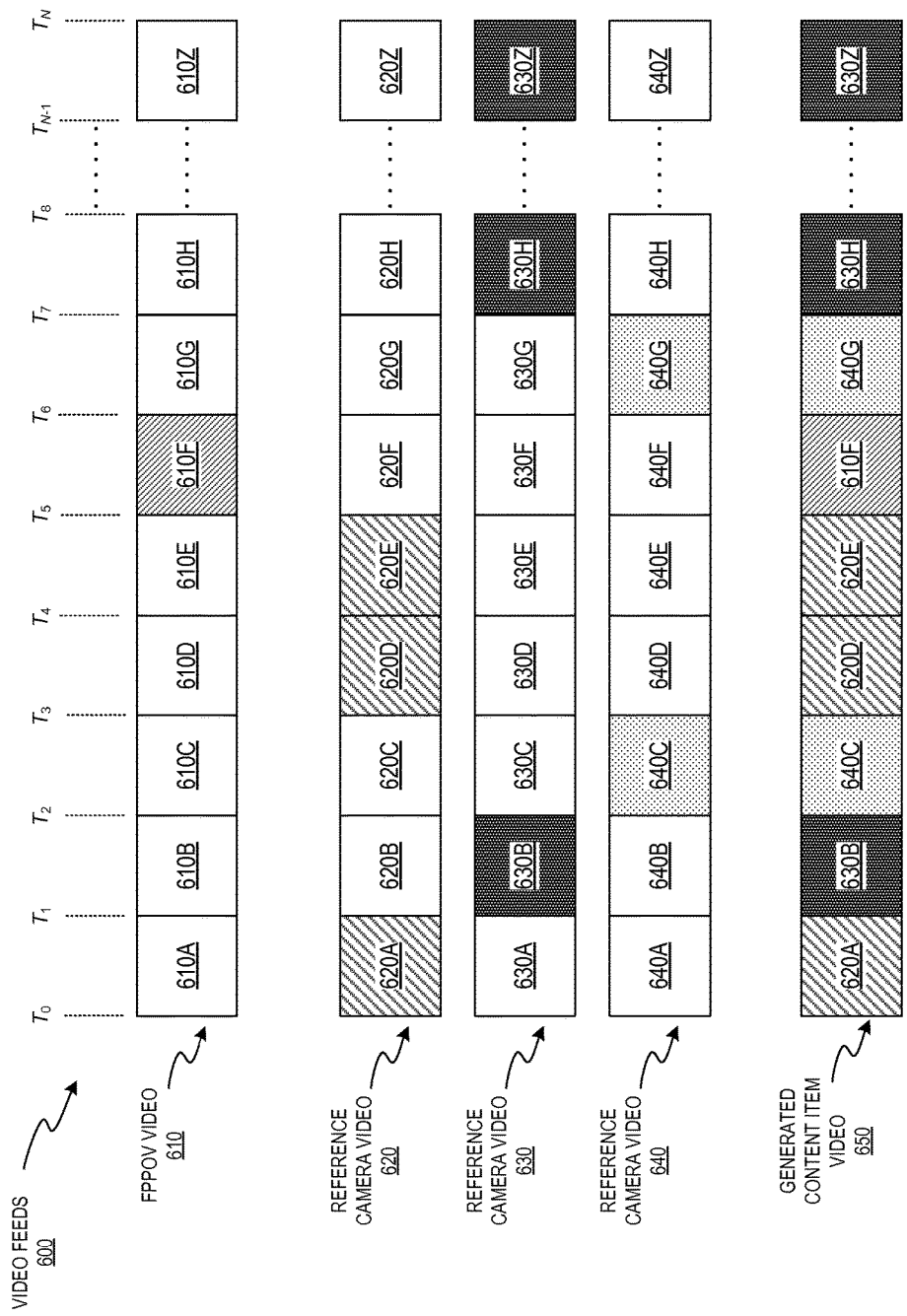
FIG. 6 is a block diagram illustrating the generation of a content item from a plurality of video feeds, in accordance with an implementation of the present disclosure.

FIG. 6 is a block diagram illustrating the generation of a content item from a plurality of video feeds 600, in accordance with an implementation of the present disclosure. In one implementation, the plurality of video feeds 600 may be received at a media server (e.g., media server 120). As discussed above, FPPOV devices and reference cameras may capture videos and images of an event at an event location (e.g., event locations 205 and 235 as illustrated in FIGS. 2A and 2B, respectively). For example, an FPPOV device may capture an FPPOV video 610, a first reference camera may capture reference camera video 620, a second reference camera may capture reference camera video 630, and a third reference camera may capture reference camera video 640. Each of the videos 610, 620, 630, and 640 includes multiple portions. For example, FPPOV video 610 includes portions 610A through 610Z, reference camera video 620 includes portions 620A through 620Z, etc. Each portion may include one or more images and/or frames. Although FIG. 6 illustrates the portions as being of the same size, each of the portions may be of different sizes and/or lengths. Each of the portions of the videos 610, 620, 630, and 640 are associated with certain durations of time in the event. For example, portion 630A is associated with the time duration between times $T_0$ and $T_1$ (e.g., may depict the event from the time $T_0$ to $T_1$). The time duration between times $T_0$ and $T_1$ may correspond to a single frame of video, multiple frames of video, or a single captured image. In another example, portion 640G is associated with the time duration between times $T_6$ and $T_7$ (e.g., may depict the event from time $T_6$ and $T_7$). In a further example, the portion 640Z is associated with the time duration between time $T_{N-1}$ and $T_N$ (e.g., may depict the event from the time $T_{N-1}$ and $T_N$), with N corresponding to a number of video portions. In some implementations, one or more of the videos 610, 620, 630, and 640 may have different lengths, and are time synchronized.

As discussed above, the media server may analyze videos 610, 620, 630, and 640 to identify an ROI captured by the FPPOV device for any given time duration (e.g., using the registration module 330). For example, the media server identify portions of the reference camera videos 620, 630, and 640 that best capture the ROI of the FPPOV video 610. As the ROI changes (e.g., the FPPOV device is pointed in a different direction), the reference camera that best captures the ROI may also change. As illustrated in FIG. 6, during the time duration between times $T_0$ and $T_1$, the media server may have determined that portion 620A best captures the ROI captured by FPPOV video 610 (as indicated by the shading). For example, a video frame or image captured by the FPPOV device at time $T_0$ may have been mapped to a frame (also captured at time $T_0$) of each of portions 620A, 630A, and 640A and scored, as described above with respect to FIGS. 4 and 5. In one implementation, frames captured during the time duration between times $T_0$ and $T_1$ are constantly mapped. In another implementation, mapping occurs periodically (e.g., every 30 frames, or 1 second for a frame rate of 30 frames per second). In another implementation, mapping/registration occurs aperiodically, for example, in response to a rapid change in IMU data (e.g., a sudden move of the FPPOV device in which a measured rotational speed exceeds a threshold rotational speed), a change in an audio track of recorded video (e.g., an intensity of recorded audio from the FPPOV device or a reference camera exceeds a threshold intensity), etc.

At time $T_1$, the media server may have determined that a frame of portion 630B best captures the ROI of the FPPOV device. For example, at time $T_1$, the FPPOV device may be pointing at a new ROI within the event location. During a time duration from $T_1$ to $T_2$, portion 630B was determined by the media server to correspond to the camera (in this case, the second reference camera) that best captures the ROI. This determination may have been made in accordance with any of the implementations described herein, such as mapping one or more frames from FPPOV video 610 to frames of reference camera videos 620, 630, and 640. At time $T_2$, the media server may have determined that a frame of portion 640C best captures the ROI of the FPPOV device.

At time $T_3$, the media server may have determined that a frame of portion 620D best captures the ROI of the FPPOV device. However, at time $T_4$, the media server may have determined that there is currently no ROI to capture from time $T_4$ to $T_5$ (a non-interesting duration). For example, IMU data captured prior to $T_4$ and up until $T_5$ may indicate that the FPPOV device was pointed in a direction that falls within a pre-defined range for a length of time (e.g., within 10° of a vertical axis defined relative to the scene, as defined by the media server). As another example, the media server may have attempted to match frames of reference camera videos 620, 630, and 640 to a corresponding frame of the FPPOV video 610, and determined that none of the mappings satisfy a mapping score threshold condition (e.g., poor matches). As another example, the user of the FPPOV device may have temporarily powered off the FPPOV device, or suspended recording (e.g., by selecting an option to capture a picture). In each of these examples, the first reference camera may be selected as the ROI-capturing camera during the time duration from time $T_4$ to $T_5$ despite the media server not identifying a best-matched frame. For example, portion 620E may be selected for the present time duration because portion 620D was the previously selected portion (both portions corresponding to the first reference camera). As another example, the first reference camera may have been previously designated by the media server as the default camera for capturing the ROI during the non-interesting duration from time $T_4$ to $T_5$.

At time $T_5$, the media server may have determined that a frame of portion 610F best captures the ROI during the time duration from $T_5$ to $T_6$. In one implementation, this determination is made in response to detecting (e.g., from IMU data) that the user of the FPPOV device has taken an action indicating that he/she wishes to capture the ROI directly with the FPPOV device (e.g., record personal footage). The portion 610F will be designated as the ROI-capturing video during the time duration from $T_5$ to $T_6$, which may be a pre-defined length of time (e.g., 10 seconds) or specified directly by the user of the FPPOV device. The capturing of personal footage based on an action taken by the user is described in greater detail with respect to FIG. 11.

The process may continue in a similar fashion until time $T_N$, which corresponds to an endpoint of the recording session (e.g., a pre-determined end time, a point at which the FPPOV is shut down, a point at which one or more of the reference cameras are shut down, etc.). In one implementation, a content item may be generated based on the mapping analysis described above. Generated content item video 650 corresponds to a video ranging from times $T_0$ to $T_N$ that was generated from the portions of reference camera videos 620, 630, and 640. Each of the portions of generated content item video 650 correspond to one or more portions of the reference camera videos 620, 630, and 640, and the FPPOV device video 610 that were determined by the media server to best capture the ROI of the FPPOV device for a given time duration (e.g., using content module 350). In one implementation, generated content item video 650 represents a video feed (e.g., a broadcast video feed) generated in real-time (e.g., using content module 350). At any given time, one of the reference cameras may be selected as the camera from which the video feed is sourced, based on the aforementioned mapping. For example, the media server (e.g., using content module 350) may designate the third reference camera corresponding to reference camera video 640 as the source camera for the video feed from times $T_6$ to $T_7$ based a determination that at least one frame captured was a best-matched frame for capturing the ROI of the FPPOV device at a given time.

Figure 7:
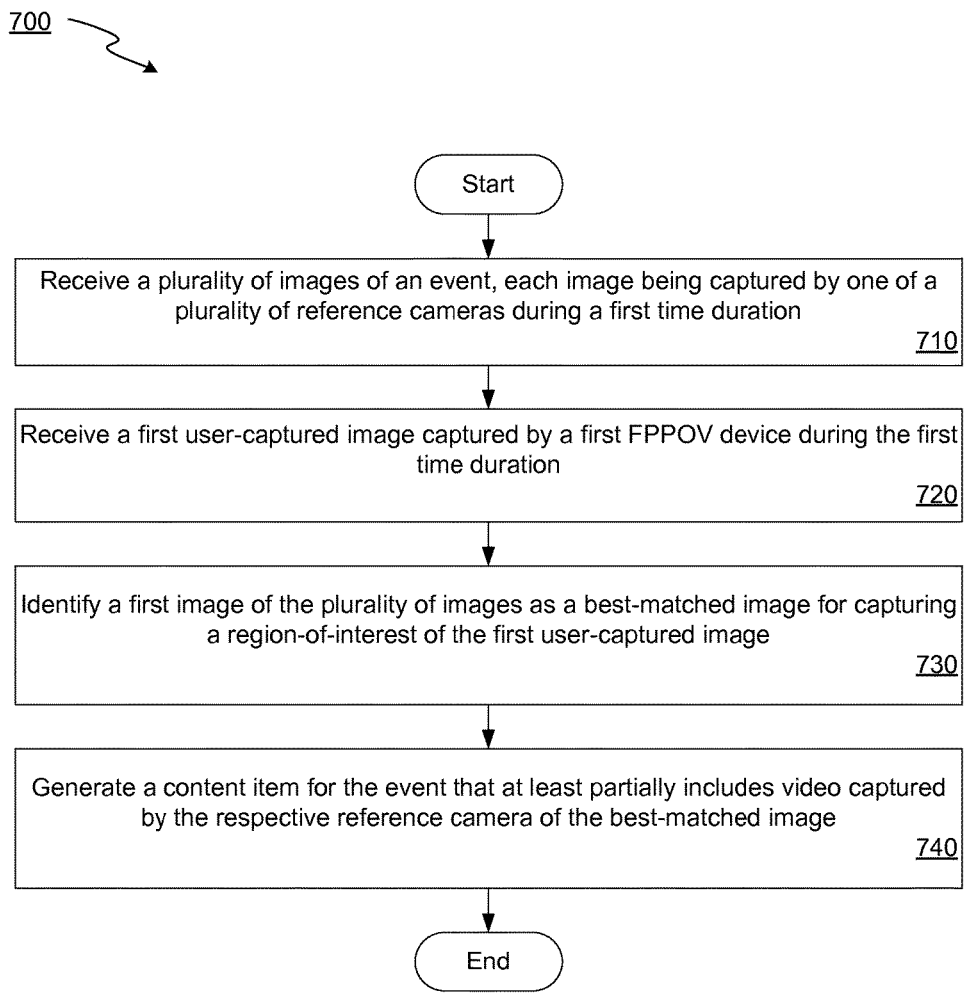
FIG. 7 is a flow diagram illustrating a method for determining the attention of a user based on data captured by an FPPOV device of the user, in accordance with an implementation of the present disclosure.

FIG. 7 is a flow diagram illustrating a method 700 for determining the attention of a user based on data captured by an FPPOV device of the user, in accordance with an implementation of the present disclosure. The method 700 may be performed by processing logic that includes hardware (e.g., circuitry, dedicated logic, programmable logic, microcode, etc.), software (e.g., instructions run on a processing device to perform hardware simulation), or a combination thereof.

In one implementation, method 800 may be performed by ROI component 130 as described with respect to FIGS. 1 and 3.

Referring to FIG. 7, method 700 begins at block 710 when a plurality of images (e.g., video frames or static images) of an event are captured by one of a plurality of reference cameras (e.g., cameras 140A through 140Z) captured during a first time duration are received (e.g., received by media server 120 and/or stored in data store 106). In one implementation, the plurality of images are received in the form of video captured by the reference cameras (e.g., video clips or a live/streaming videos). Each image may be a frame extracted from a respective video of the reference cameras, and correspond to a common time point (e.g., images corresponding to a common time stamp). In another implementation, the plurality of images are received in the form of individual images captured by each of the reference cameras at the same time.

At block 720, a first user-captured image (e.g., a video frame or static image) captured by a first FPPOV device (e.g., FPPOV device 110A) during the first time duration is received (e.g., received by media server 120 and/or stored in data store 106). In one implementation, the first user-captured image is received in the form of video captured by the FPPOV device (e.g., a video clip or a live/streaming video). The first user-captured image may be a frame extracted from the user-captured video, and correspond to the common time point of the plurality of images. In another implementation, the first user-captured image is received in the form of a single image captured by the FPPOV device and corresponding to the common time point. In one implementation, the plurality of images and the first user-captured image are synchronized in time (e.g., using the synchronization module 320). The first time duration may correspond to a time to capture an individual frame of video (e.g., $\frac{1}{30}$ seconds for a frame rate of 30 FPS), or a longer time duration.

At block 730, a first image of the plurality of images is identified as a best-matched image (e.g., using registration module 330) for capturing an ROI of the first user-captured image. In some implementations, the first image is identified based on mapping of the first user-captured image to each of the plurality of images, and determining that the first image is the best-matched image has a higher mapping score than a remainder of the plurality of images. In one implementation, identifying the first image of the plurality of images is based at least in part on IMU data received from the first FPPOV device during or before the first time duration. For example, the IMU data may indicate (in accordance with any of the implementations described herein) that a user of the FPPOV device is not attempting to capture an ROI. Accordingly, the first image may be identified, for example, as an image captured by a designated reference camera. In one implementation, identifying the first image may include selecting the respective camera of the first image as the best camera for capturing the ROI during the first time duration.

At block 740, a content item is generated (e.g., using content module 350) for the event that at least partially includes video captured by the respective camera of the best-matched image. In one implementation, the content item includes video captured by the respective camera of the best-matched image during or immediately after the first time duration. In one implementation, the respective camera of the best-matched image may be selected as the camera from which a video stream is sourced.

Figure 8:
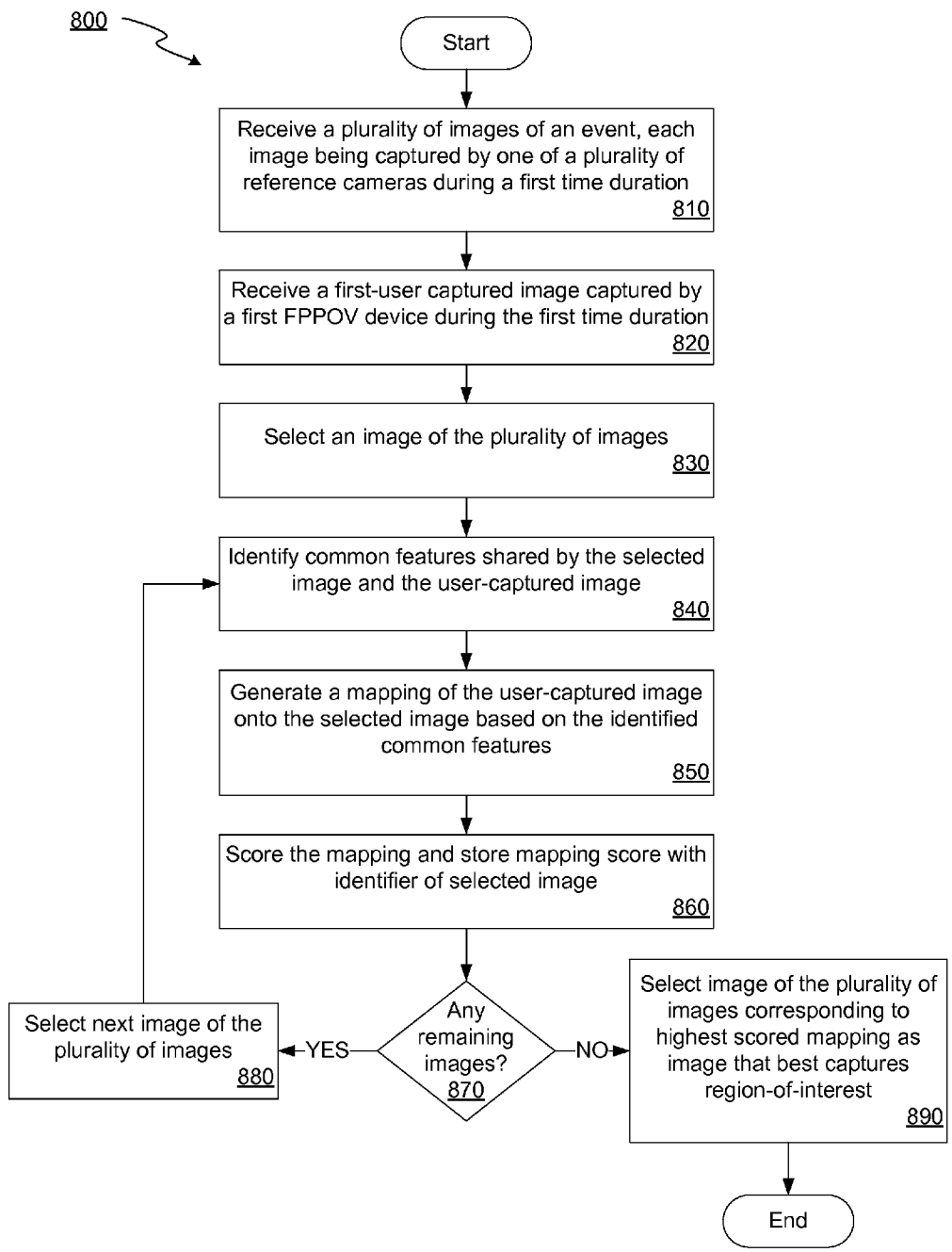
FIG. 8 is a flow diagram illustrating a method for identifying an image captured by a static camera that best captures a region-of-interest in a scene or event, in accordance with an implementation of the present disclosure.

FIG. 8 is a flow diagram illustrating a method 800 for identifying an image captured by a static camera that best captures a region-of-interest in a scene or event, in accordance with an implementation of the present disclosure. The method 800 may be performed by processing logic that includes hardware (e.g., circuitry, dedicated logic, programmable logic, microcode, etc.), software (e.g., instructions run on a processing device to perform hardware simulation), or a combination thereof. In one implementation, method 800 may be performed by ROI component 130 as described with respect to FIGS. 1 and 3.

Referring to FIG. 8, method 800 begins at block 810 when a plurality of images (e.g., video frames or static images) of an event are captured by one of a plurality of cameras (e.g., cameras 140A through 140Z) captured during a first time duration are received (e.g., received by media server 120 and/or stored in data store 106). At block 820, a first user-captured image (e.g., a video frame or static image) captured by a first FPPOV device (e.g., FPPOV device 110A) during the first time duration is received (e.g., received by media server 120 and/or stored in data store 106). Blocks 810 and 820 may be performed in a similar manner as blocks 710 and 720, respectively, described with respect to FIG. 7.

At block 830, an image is selected from the plurality of images. For example, the image may correspond to a frame of a portion of video captured by a first reference camera (e.g., a frame captured of portion 620A of reference camera video 620).

At block 840, common features/points shared by the selected image and the user-captured image are identified. For example, any suitable feature matching algorithm may be used to identify features common to each of the images, as described with respect to FIG. 4. At block 850, a mapping of the user-captured to the selected image is generated based on the identified common features, as described with respect to FIG. 5. For example, an affine transformation may be calculated to map the user-captured image to the selected image.

At block 860, a score of the mapping is generated and stored with an identifier of the selected image. For example, the selected image and an associated identifier (e.g., an index) may be stored in a data store (e.g., data store 106). A score of the mapping may be computed and stored along with the identifier in order to associate the selected image with the score. The score may be based on a descriptor computed for each of the user-captured image and the selected image (e.g., an $L^2$ distance of the descriptors), as described with respect to FIG. 5.

At block 870, a determination is made (e.g., by the media server) as to whether there are any remaining images of the plurality of images. If so, method 800 proceeds to block 880, where a next image of the plurality of images is selected, and blocks 840, 850, and 860 are performed with respect to the newly selected image.

If at block 870 it is determined that there are no remaining images, method 800 proceeds to block 890. At block 890, an image of the plurality of images having the highest scored mapping is identified as the best-matched image for capturing the ROI of the FPPOV device during the first time duration. Method 800 may repeat for a second, third, etc. time duration in order to generate a content item or video stream from captured images/video of the cameras that captured the best-matched images at each time duration.

Figure 9:
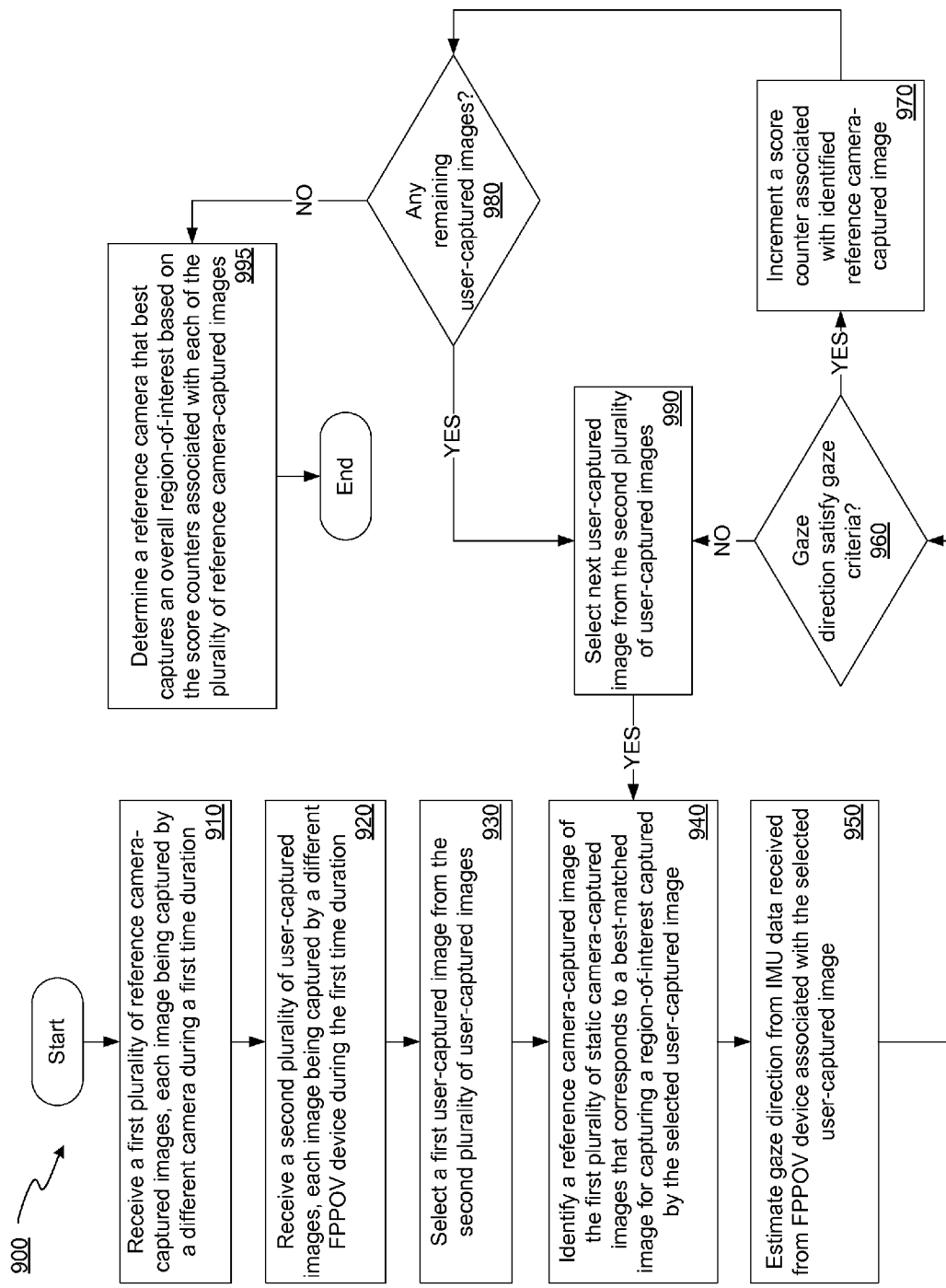
FIG. 9 is a flow diagram illustrating a method for determining an overall region-of-interest among a group of users of FPPOV devices, in accordance with an implementation of the present disclosure.

FIG. 9 is a flow diagram illustrating a method 900 for determining an overall region-of-interest among a group of users of FPPOV devices, in accordance with an implementation of the present disclosure. The method 900 may be performed by processing logic that includes hardware (e.g., circuitry, dedicated logic, programmable logic, microcode, etc.), software (e.g., instructions run on a processing device to perform hardware simulation), or a combination thereof. In one implementation, method 900 may be performed the ROI component 130 as described with respect to in FIGS. 1 and 3.

Referring to FIG. 9, method 900 begins at block 910 when a plurality of static camera-captured images (e.g., video frames or static images) of an event are captured by one of a plurality of cameras (e.g., cameras 140A through 140Z) captured during a first time duration are received (e.g., received by media server 120 and/or stored in data store 106). Block 910 may be performed in a similar manner as block 710 described with respect to FIG. 7.

At block 920, a second plurality of FPPOV-captured images (e.g., video frames or static images) each being captured by a different FPPOV device (e.g., FPPOV devices 110A through 110Z) during the first time duration is received (e.g., received by media server 120 and/or stored in data store 106). Each user-captured image may be received in a similar manner as block 720 described with respect to FIG. 7.

At block 930, a user-captured image of the second plurality of user-captured images is selected. For example, the selected image may correspond to a frame of a portion of video or an individual image captured by one of the FPPOV devices.

At block 940, a reference camera-captured image of the first plurality of reference camera-captured is identified that corresponds to a best-matched image for capturing an ROI of the selected FPPOV-captured image. In one implementation, block 940 is performed in accordance with the implementations described with respect to methods 700 and 800.

At block 960, a gaze direction is estimated from IMU data received from the FPPOV device associated with the selected user-captured image. The IMU data (e.g., IMU data 364A) may be received from the selected FPPOV device and stored (e.g., in data store 106). A gaze direction may be estimated in accordance with any of the implementations described herein, and may be based on a calibration process (e.g., performed by the calibration module 310).

At block 970, a determination is made as to whether the estimated gaze direction satisfies gaze criteria. For example, the gaze criteria may be a pre-defined range used to determine whether or not the user is currently interested in the event location. In one implementation, one or more pre-defined ranges may be used to determine whether the estimated gaze direction falls within the one or more pre-defined ranges (e.g., if the FPPOV device is pointed within 10° of a vertical axis in an event location in which the events are taking place along a horizontal direction). In some implementations, IMU data and/or other parameters may be utilized in addition to or in lieu of gaze direction. For example, rapid motions of the FPPOV device or obstruction of a viewing portion of the FPPOV device may be used as indicators that the gaze criteria are not satisfied. In response to determining that the gaze criteria are not satisfied, method 900 proceeds to block 990, where a next user-captured image is selected from the plurality of user-captured images. Blocks 940, 950, 960, and 970 are then performed with respect to the newly selected user-captured image. If at block 990 the gaze criteria are satisfied, method 900 proceeds to block 970. In some implementations, blocks 950, 960, and 970 may be performed prior to block 940, in which block 940 is omitted in response to determining that the gaze criteria are not satisfied.

At block 970, a score counter associated with the identified reference camera-captured image is incremented. The score counter may serve as an indicator of a number of times that an associated reference-camera captured image has been identified as the best-matched image for capturing an ROI of an FPPOV device. In some implementations, the score counter may be incremented based on a weight value associated with a particular FPPOV device. For example, a user of a particular FPPOV device may be designated as the "director", and increments to a score counter based on a user-captured image of the director's FPPOV device may be greater (e.g., by a factor of 2, 3, etc.) than increments to the score counter based on user-captured images of other FPPOV devices.

At block 980, a determination is made (e.g., by media server 120) as to whether there are any remaining images of the second plurality of user-captured images. If so, method 900 proceeds to block 990. Otherwise, block 980 proceeds to block 995.

At block 995, a determination is made as to which reference camera best captures the overall ROI based on score counters associated with each of the first plurality of reference camera-captured images. For example, for a system using two reference cameras and having five FPPOV devices each operated by different users of a group of users, the first reference camera may have a score of 3 (e.g., the first reference camera best captures the ROI of three of the five FPPOV devices) and the second reference camera may have a score of 2 (e.g., the second reference camera best captures the ROI of two of the five FPPOV devices). Accordingly, the first reference camera may be selected as the camera that best captures the overall ROI of group of users. Method 900 may be performed for subsequent time durations to allow for generation of a content item or video feed based on video from reference cameras that best capture the overall ROI for any given time duration.

Figure 10:
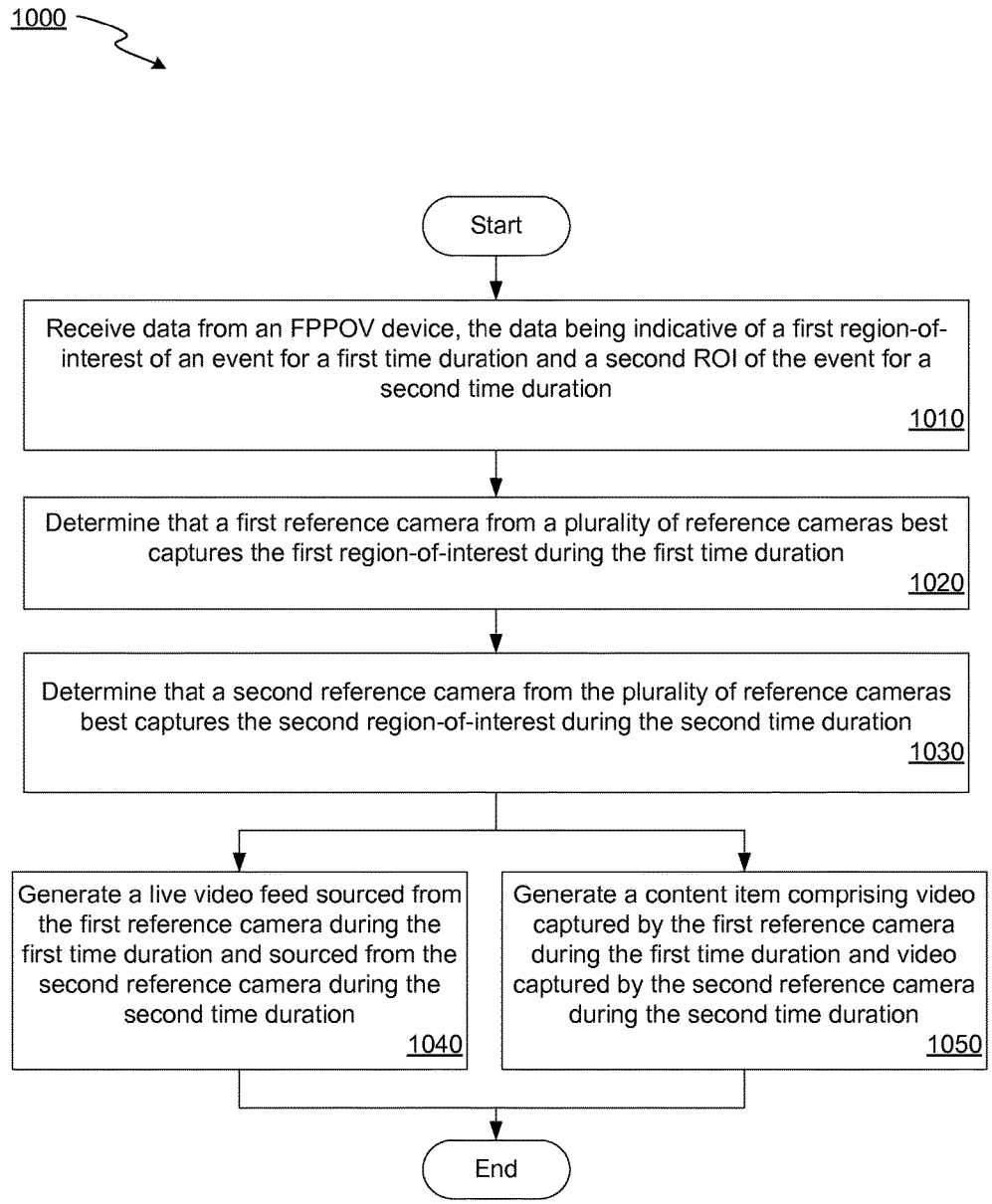
FIG. 10 is a flow diagram illustrating a method for allowing a user of an FPPOV device to direct the production of a content item or a real-time video stream, in accordance with an implementation of the present disclosure.

FIG. 10 is a flow diagram illustrating a method 1000 for allowing a user of an FPPOV device to direct the production of a content item or a real-time video stream, in accordance with an implementation of the present disclosure. The method 1000 may be performed by processing logic that includes hardware (e.g., circuitry, dedicated logic, programmable logic, microcode, etc.), software (e.g., instructions run on a processing device to perform hardware simulation), or a combination thereof. In one implementation, method 1000 may be performed by ROI component 130 as described with respect to FIGS. 1 and 3. It is noted that, although method 1000 is described with respect to directing the production of a content item or a real-time video stream, it is to be understood that the following description is an illustrative implementation and that method 1000 may be utilized in conjunction with other implementations. For example, method 1000 may be utilized to perform attention localization for video analysis and/or video annotation applications.

Referring to FIG. 10, method 1000 begins at block 1010 when data is received from an FPPOV device (e.g, FPPOV device 110A). The data may be received by a media server (e.g., received by media server 120 and/or stored in data store 106). The data may be indicative of a first ROI of an event during a first time duration and a second ROI of the event during a second time duration. The first ROI may be different than or the same as the second ROI. In some implementations, the data may be received after recording of the event has occurred, and may be post-processed by the media server. In some implementations, the data may be received and processed in real-time. For example, the data indicative of the first ROI may be received and processed by the media server prior to receiving the data indicative of the second ROI. In one implementation, additional data indicative of a third, fourth, etc. ROI corresponding to third, fourth, etc. time durations may also be received.

At block 1020, a determination is made (e.g., by the media server) that a first reference camera from a plurality of reference cameras best captures the first ROI during the first time duration. This determination may be made in accordance with any of the implementations described herein, such as the implementations described with respect to methods 700, 800 and 900. In one implementation, the determination is made based on IMU data (e.g., by estimating which of the reference cameras captures the ROI by mapping a computed gaze direction to estimated fields-of-view of the reference cameras). In one implementation, the determination is made based on audio data (e.g., by estimating a gaze direction of the FPPOV device according to sound captured by a directional microphone of the FPPOV device).

At block 1030, a determination is made (e.g., by the media server) that a second reference camera from a plurality of reference cameras best captures the second ROI during the second time duration. This determination may be made in accordance with any of the implementations described herein, such as the implementations described with respect to methods 700, 800 and 900.

In some implementations, blocks 1040 and 1050 may be performed as alternatives to each other, or may both be performed. At block 1040, a live video feed is generated. The live video feed is sourced from the first reference camera during the first time duration, and is sourced from the second reference camera during the second time duration. At block 1050, a content item is generated (e.g., in real-time or at a later time). The content item includes video captured by the first reference camera during the first time duration and video captured by the second reference camera during the second time duration. In some implementations, the content item may be generated in response to identifying personalization cues occurring during a live video feed, and storing timing information associated with the cues. Post-processing of the video may be performed to generate the content item based on the personalization cues. In some implementations, the first and second time durations are adjacent in time. In some implementations, the first and second time durations are separated by a length of time. In some implementations, each video captured by the first and second reference cameras are non-overlapping in time. In some implementations, each video captured by the first and second reference cameras are overlapping in time.

Figure 11:
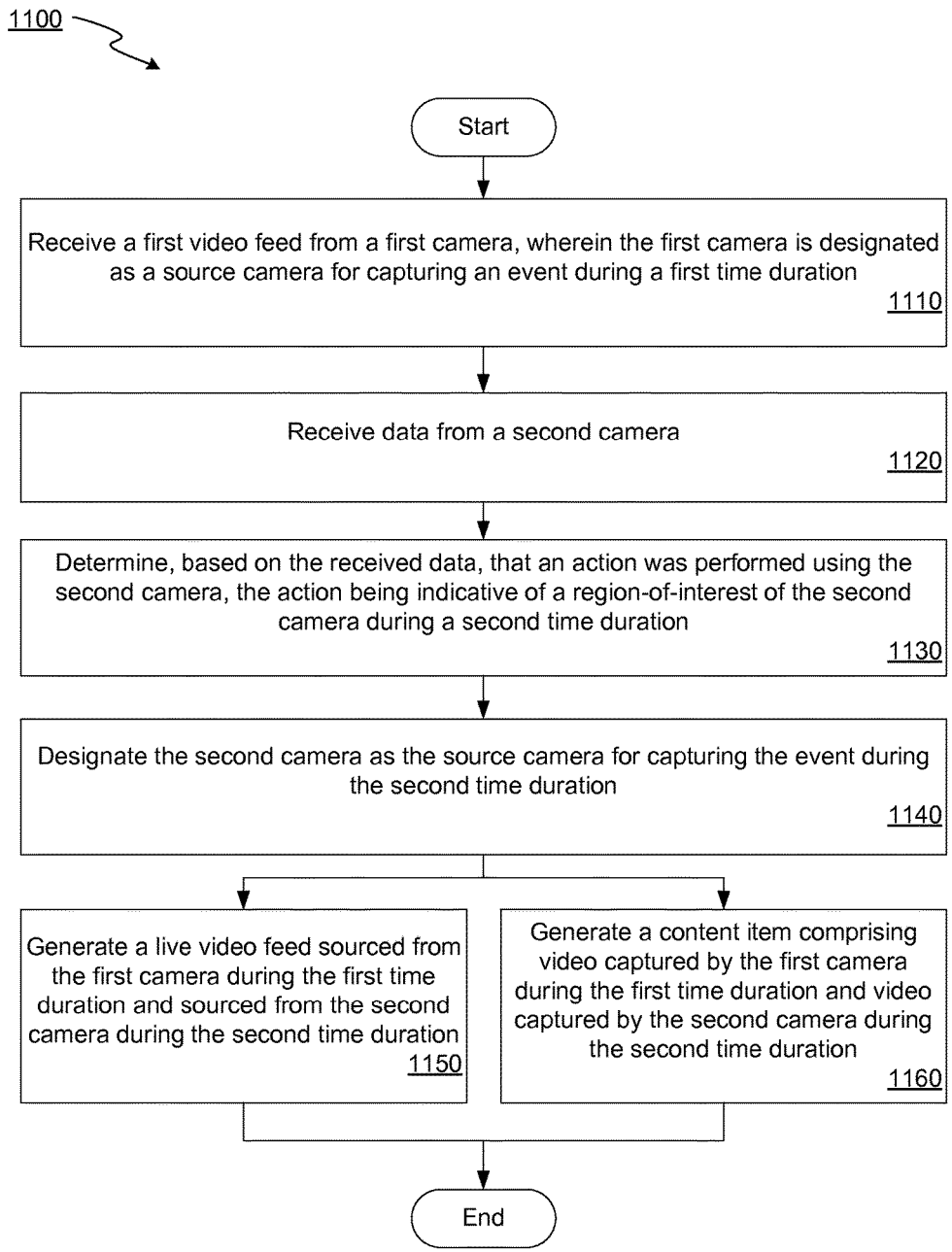
FIG. 11 is a flow diagram illustrating a method for personalizing a content item using footage captured by an FPPOV device, in accordance with an implementation of the present disclosure.

FIG. 11 is a flow diagram illustrating a method 1100 for personalizing a content item using footage captured by an FPPOV device, in accordance with an implementation of the present disclosure. The method 1100 may be performed by processing logic that includes hardware (e.g., circuitry, dedicated logic, programmable logic, microcode, etc.), software (e.g., instructions run on a processing device to perform hardware simulation), or a combination thereof. In one implementation, method 1100 may be performed by ROI component 130 as described with respect to FIGS. 1 and 3.

Referring to FIG. 11, method 1100 begins at block 1110 when a first video feed from a first camera is received (e.g., received by media server 120 and/or stored in data store 106). The first camera is designated as the source camera for capturing an event during a first time duration. In some implementations, the first camera may have been designated as the source camera according to any of the implementations described herein.

At block 1120, data from a second camera is received (e.g., by the media server 120). In one implementation, the second camera is an FPPOV device, and the data may include at least one of IMU data, image/video data, or audio data.

At block 1130, a determination is made, based on the received data, that an action was performed by a user of the second camera, the action being indicative of an ROI of the user of the second camera during a second time duration. For example, the user may take an action that indicates that he/she is interested in using the personal footage, such as selecting a record button on an FPPOV device, making a sudden movement (e.g., which may be reflected in a rapid change detected in IMU data), a voice command, etc. In one implementation, the personal footage may be captured in response to an environmental cue in addition to or in lieu of a direct action (personalization cue) taken by the user. At block 1140, the second camera is designated as the source camera for capturing the event during the second time duration in response to determining that the action performed was indicative of an ROI of the user of the second camera.

In some implementations, blocks 1150 and 1160 may be performed as alternatives to each other, or may both be performed. At block 1150, a live video feed is generated. The live video feed is sourced from the first camera (e.g., a reference camera) during the first time duration, and is sourced from the second camera (e.g., an FPPOV device) during the second time duration. At block 1160, a content item is generated (e.g., in real-time or at a later time). The content item includes video captured by the first camera (e.g., a reference camera) during the first time duration and video captured by the second camera (e.g., an FPPOV device) during the second time duration. In some implementations, the content item may be generated in response to identifying personalization cues occurring during a live video feed, and storing timing information associated with the cues. Post-processing of the video may be performed to generate the content item based on the personalization cues. In some implementations, the first and second time durations are adjacent in time. In some implementations, the first and second time durations are separated by a length of time. In some implementations, each video captured by the first and second cameras are non-overlapping in time. In some implementations, each video captured by the first and second cameras are overlapping in time.

Figure 12:
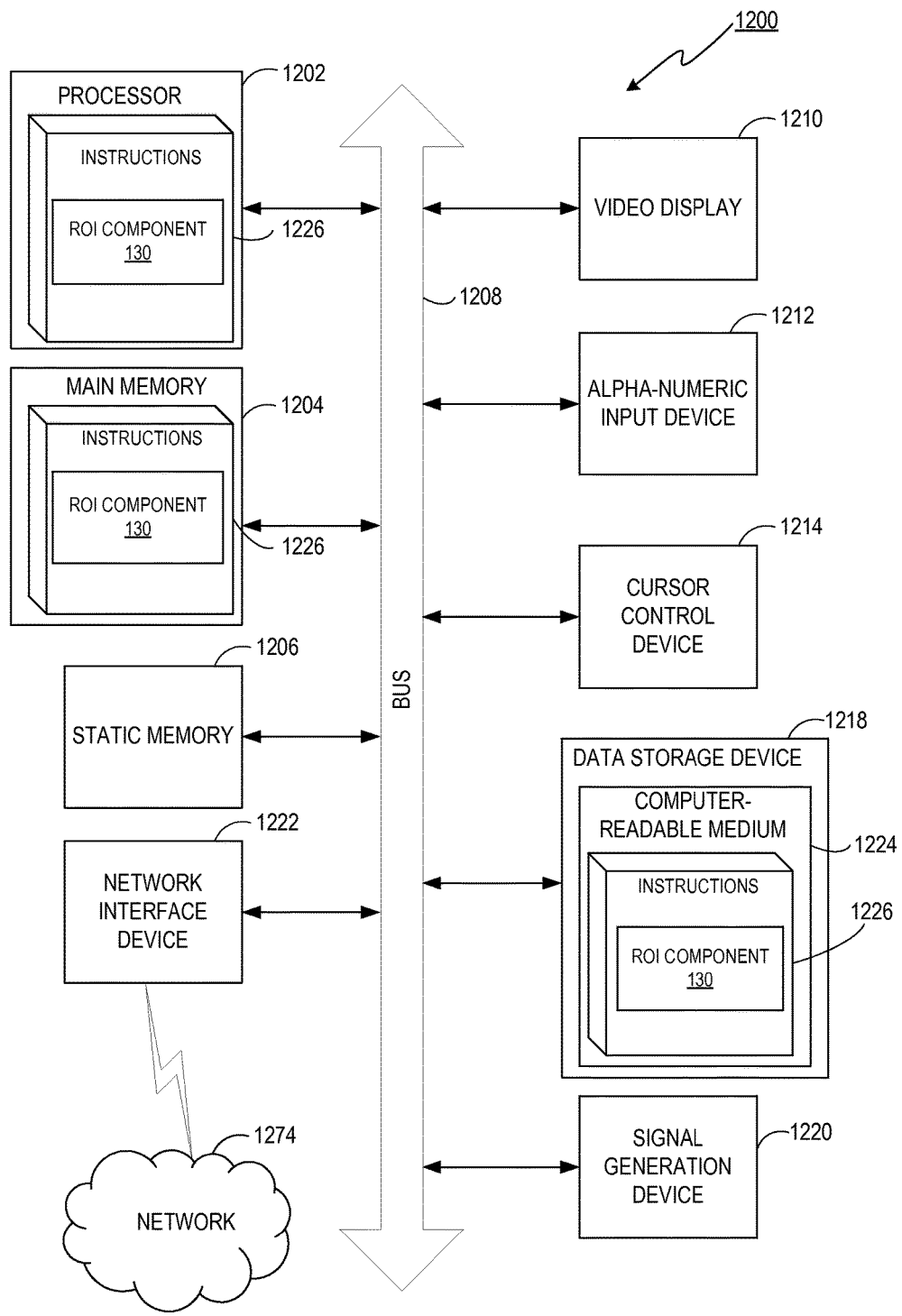
FIG. 12 is a block diagram illustrating an exemplary computer system in accordance with an implementation of the disclosure.

FIG. 12 illustrates a diagrammatic representation of a machine in the exemplary form of a computer system 1200 within which a set of instructions, for causing the machine to perform any one or more of the methodologies discussed herein, may be executed. In alternative implementations, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Some or all of the components of the computer system 1200 may be utilized by or illustrative of any of FPPOV devices 110A through 110Z, data store 106, media 120, and cameras 140A through 140Z.

The exemplary computer system 1200 includes a processing device (processor) 1202, a main memory 1204 (e.g., read-only memory (ROM), flash memory, dynamic random access memory (DRAM) such as synchronous DRAM (SDRAM) or Rambus DRAM (RDRAM), etc.), a static memory 1206 (e.g., flash memory, static random access memory (SRAM), etc.), and a data storage device 1218, which communicate with each other via a bus 1208.

Processor 1202 represents one or more general-purpose processing devices such as a microprocessor, central processing unit, or the like. More particularly, the processor 1202 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 1202 may also be one or more special-purpose processing devices such as an application specific integrated circuit (ASIC), a field programmable gate array (FPGA), a digital signal processor (DSP), network processor, or the like. The processor 1202 is configured to execute instructions 1226 for performing the operations and steps discussed herein.

The computer system 1200 may further include a network interface device 1222. The computer system 1200 also may include a video display unit 1210 (e.g., a liquid crystal display (LCD), a cathode ray tube (CRT), or a touch screen), an alphanumeric input device 1212 (e.g., a keyboard), a cursor control device 1214 (e.g., a mouse), and a signal generation device 1220 (e.g., a speaker).

The data storage device 1218 may include a computer-readable storage medium 1224 on which is stored one or more sets of instructions 1226 (e.g., software) embodying any one or more of the methodologies or functions described herein. The instructions 1226 may also reside, completely or at least partially, within the main memory 1204 and/or within the processor 1202 during execution thereof by the computer system 1200, the main memory 1204 and the processor 1202 also constituting computer-readable storage media. The instructions 1226 may further be transmitted or received over a network 1274 (e.g., the network 105) via the network interface device 1222.

In one implementation, the instructions 1226 include instructions for one or more ROI components 130, which may correspond to the identically-named counterpart described with respect to FIGS. 1 and 3, and/or a software library containing methods for localizing the attention of a user based on data captured by an FPPOV device of the user. While the computer-readable storage medium 1224 is shown in an exemplary implementation to be a single medium, the terms "computer-readable storage medium" or "machine-readable storage medium" should be taken to include a single medium or multiple media (e.g., a centralized or distributed database, and/or associated caches and servers) that store the one or more sets of instructions. The terms "computer-readable storage medium" or "machine-readable storage medium" shall also be taken to include any transitory or non-transitory medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description may have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is herein, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the preceding discussion, it is appreciated that throughout the description, discussions utilizing terms such as "receiving", "transmitting", "generating", "adding", "substracting", "removing", "analyzing", "determining", "enabling", "identifying", "modifying" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The disclosure also relates to an apparatus, device, or system for performing the operations herein. This apparatus, device, or system may be specially constructed for the required purposes, or it may include a general purpose computer selectively activated or reconfigured by a computer program stored in the computer. Such a computer program may be stored in a computer- or machine-readable storage medium, such as, but not limited to, any type of disk including floppy disks, optical disks, compact disk read-only memories (CD-ROMs), and magnetic-optical disks, read-only memories (ROMs), random access memories (RAMs), EPROMs, EEPROMs, magnetic or optical cards, or any type of media suitable for storing electronic instructions.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Reference throughout this specification to "an implementation" or "one implementation" means that a particular feature, structure, or characteristic described in connection with the implementation is included in at least one implementation. Thus, the appearances of the phrase "an implementation" or "one implementation" in various places throughout this specification are not necessarily all referring to the same implementation.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
    receiving, by a processing device, a plurality of images of an event, wherein each image was captured by one of a plurality of reference cameras during a first time duration of the event;
    receiving, by the processing device, a first user-captured image captured by a first first-person point-of-view (FPPOV) device during the first time duration;
    identifying, by the processing device, a first image of the plurality of images as a best-matched image for capturing a region-of-interest (ROI) of the first user-captured image;
    determining, by the processing device, that a first reference camera of the plurality of reference cameras captured the best-matched image during the first time duration; and
    generating, by the processing device, a content item comprising a plurality of video portions representative of different time durations of the event, each of the plurality of video portions corresponding to video sourced from one of the plurality of reference cameras during a given time duration, wherein a first video portion of the plurality of video portions corresponds to video sourced from the first reference camera during the first time duration.

2. The method of claim 1, further comprising:
    mapping the first user-captured image onto each of the plurality of images; and
    for each of the plurality of images:
        identifying common features shared by the image and the user-captured image;
        generating a mapping of the user-captured image onto the image based on the identified common features; and
        generating a score for the mapping.

3. The method of claim 2, wherein selecting the first image of the plurality images as the best-matched image for capturing the ROI comprises:
    selecting an image of the plurality of images corresponding to a highest scored mapping as the best-matched image.

4. The method of claim 1, wherein a second portion of the plurality of video portions corresponds to video sourced from a second reference camera during a second time duration, the second reference camera having captured a second image identified as a best-matched image for capturing an ROI of a second user-captured image captured during the second time duration.

5. The method of claim 1, wherein selecting the first image of the plurality of images as the best-matched image for capturing the ROI comprises selecting the first image of the plurality of images based at least in part on inertial measurement unit data received from the first FPPOV device during the first time duration.

6. The method of claim 1, further comprising:
selecting a subset of the plurality of images, each image of the subset corresponding to a best-matched image based on a mapping to one or more of a plurality of user-captured images each captured by different FPPOV devices, wherein the plurality of user-captured images includes the first user-captured image captured by the first FPPOV device; and
determining that an image within the subset corresponds to an overall ROI for users of each of the different FPPOV devices.

7. The method of claim 6, wherein determining that the image within the subset corresponds to an overall ROI for the users of each of the different FPPOV devices comprises selecting an image having a highest number of highest scored mappings.

8. The method of claim 1, wherein each of the plurality of images corresponds to a frame from video captured by a respective reference camera.

9. An apparatus comprising:
a memory; and
a processing device communicably coupled to the memory, the processing device to:
receive a plurality of images of an event, wherein each image was captured by one of a plurality of reference cameras during a first time duration of the event;
receive a first user-captured image captured by a first first-person point-of-view (FPPOV) device during the first time duration;
identify a first image of the plurality of images as a best-matched image, based on the first user-captured image, for capturing a region-of-interest (ROI);
determine that a first reference camera of the plurality of reference cameras captured the best-matched image during the first time duration; and
generate a content item comprising a plurality of video portions representative of different time durations of the event, each of the plurality of video portions corresponding to video sourced from one of the plurality of reference cameras during a given time duration, wherein a first video portion of the plurality of video portions corresponds to video sourced from the first reference camera during the first time duration.

10. The apparatus of claim 9, wherein the processing device is further to:
map the first user-captured image onto each of the plurality of images; and
for each of the plurality of images:
identify common features shared by the image and the user-captured image;
generate a mapping of the user-captured image onto the image based on the identified common features; and
generate a score for the mapping.

11. The apparatus of claim 10, wherein the processing device is further to:
select an image of the plurality of images corresponding to a highest scored mapping as the best-matched image.

12. The apparatus of claim 9, wherein a second portion of the plurality of video portions corresponds to video sourced from a second reference camera during a second time duration, the second reference camera having captured a second image identified as a best-matched image for capturing an ROI of a second user-captured image captured during the second time duration.

13. The apparatus of claim 9, wherein the processing device is further to:
select the first image of the plurality of images based at least in part on inertial measurement unit data received from the first FPPOV device during the first time duration.

14. The apparatus of claim 9, wherein the processing device is further to:
select a subset of the plurality of images, each image of the subset corresponding to a best-matched image based on a mapping to one or more of a plurality of user-captured images each captured by different FPPOV devices, wherein the plurality of user-captured images includes the first user-captured image captured by the first FPPOV device; and
determine that an image within the subset corresponds to an overall ROI for users of each of the different FPPOV devices.

15. The apparatus of claim 14, wherein the processing device is further to:
select an image having a highest number of highest scored mappings.

16. The apparatus of claim 9, wherein each of the plurality of images corresponds to a frame from video captured by a respective reference camera.

17. A non-transitory, machine-readable storage medium having instructions encoded thereon which, when executed by a processing device, cause the processing device to perform operations comprising:
receiving, by the processing device, a plurality of images of an event, wherein each image was captured by one of a plurality of reference cameras during a first time duration of the event;
receiving, by the processing device, a first user-captured image captured by a first first-person point-of-view (FPPOV) device during the first time duration;
selecting, by the processing device, a first image of the plurality of images as a best-matched image, based on the first user-captured image, for capturing a region-of-interest (ROI);
determining, by the processing device, that a first reference camera of the plurality of reference cameras captured the best-matched image during the first time duration; and
generating, by the processing device, a content item comprising a plurality of video portions representative of different time durations of the event, each of the plurality of video portions corresponding to video sourced from one of the plurality of reference cameras during a given duration, wherein a first video portion of the plurality of video portions corresponds to video sourced from the first reference camera during the first time duration.

18. The non-transitory, machine-readable storage medium of claim 17, wherein the operations further comprise:
mapping the first user-captured image onto each of the plurality of images; and
for each of the plurality of images:
identifying common features shared by the image and the user-captured image;

generating a mapping of the user-captured image onto the image based on the identified common features; and generating a score for the mapping.

19. The non-transitory, machine-readable storage medium of claim 17, wherein selecting the first image of the plurality of images as the best-matched image for capturing the ROI comprises selecting the first image of the plurality of images based at least in part on inertial measurement unit data received from the first FPPOV device during the first time duration.

20. The non-transitory, machine-readable storage medium of claim 17, wherein the operations further comprise:

selecting a subset of the plurality of images, each image of the subset corresponding to a best-matched image based on a mapping to one or more of a plurality of user-captured images each captured by different FPPOV devices, wherein the plurality of user-captured images includes the first user-captured image captured by the first FPPOV device; and determining that an image within the subset corresponds to an overall ROI for users of each of the different FPPOV devices.

* * * * *